United States Patent
Kusama et al.

(10) Patent No.: US 10,228,498 B2
(45) Date of Patent: Mar. 12, 2019

(54) OPTICAL-DIFFUSION FILM FOR DISPLAY AND DISPLAY DEVICE USING SAME

(71) Applicants: LINTEC Corporation, Itabashi-Ku, Tokyo (JP); TOHOKU University, Sendai-shi, Miyagi (JP)

(72) Inventors: Kentaro Kusama, Tokyo (JP); Baku Katagiri, Tokyo (JP); Tomoo Orui, Tokyo (JP); Satoru Shoshi, Tokyo (JP); Hideo Fujikake, Sendai (JP); Takahiro Ishinabe, Sendai (JP)

(73) Assignees: LINTEC CORPORATION, Tokyo (JP); TOHOKU UNIVERSITY, Miyagi (JP)

( * ) Notice: Subject to any disclaimer, the term of this patent is extended or adjusted under 35 U.S.C. 154(b) by 146 days.

(21) Appl. No.: 14/786,878

(22) PCT Filed: Mar. 13, 2014

(86) PCT No.: PCT/JP2014/056608
§ 371 (c)(1),
(2) Date: Oct. 23, 2015

(87) PCT Pub. No.: WO2014/178231
PCT Pub. Date: Nov. 6, 2014

(65) Prior Publication Data
US 2016/0070035 A1    Mar. 10, 2016

(30) Foreign Application Priority Data
Apr. 30, 2013  (JP) ................................. 2013-095640

(51) Int. Cl.
*G02B 5/02*    (2006.01)
*G02F 1/1335*   (2006.01)

(52) U.S. Cl.
CPC ......... *G02B 5/0236* (2013.01); *G02B 5/0242* (2013.01); *G02B 5/0257* (2013.01);
(Continued)

(58) Field of Classification Search
CPC ......... G02F 1/133504; G02F 1/133606; G02B 5/0236; G02B 5/0268; G02B 5/0294; G02B 5/0242; G02B 5/0257; G02B 5/0278
See application file for complete search history.

(56) References Cited

U.S. PATENT DOCUMENTS

2004/0047042 A1*  3/2004  Takahashi ............ G02B 5/0242
                                                    359/599
2005/0030444 A1*  2/2005  Fujiwara ........... G02F 1/133504
                                                    349/64
(Continued)

FOREIGN PATENT DOCUMENTS

EP         2940494 A1    11/2015
JP      2003-195275 A     7/2003
(Continued)

OTHER PUBLICATIONS

Komatsu et al., Optical Sheet, Surface Light Source Device and Liquid Crystal Display Device, Machine Translation of JP 2005-189303 A from AIPN website, All pages.*
(Continued)

*Primary Examiner* — Hoan C Nguyen
(74) *Attorney, Agent, or Firm* — Renner, Kenner; Arthur M. Reginelli

(57) ABSTRACT

An optical-diffusion film for display which, particularly when applied to a display device using a collimated backlight as a backlight for the display panel, can efficiently diffuse and emit a highly directional light emitted from the collimated backlight toward the front of the display device
(Continued)

as image display light, without allowing straight transmission of the highly directional light, and a display device using the optical-diffusion film for display are provided. Disclosed is a single layered optical-diffusion film having a columnar structure in which plural pillar-shaped objects having a relatively high refractive index are arranged to stand close together in a film thickness direction in a region having a relatively low refractive index, in which the film thickness of the optical-diffusion film has a value within the range of 60 to 700 μm, and the haze value obtainable in the case in which light is made incident in the normal line direction of the film plane has a value of 80% or more.

6 Claims, 21 Drawing Sheets

(52) U.S. Cl.
CPC ......... *G02B 5/0268* (2013.01); *G02B 5/0278* (2013.01); *G02B 5/0294* (2013.01); *G02F 1/133504* (2013.01); *G02F 1/133606* (2013.01); *G02F 2001/133507* (2013.01)

(56) References Cited

U.S. PATENT DOCUMENTS

| | | | |
|---|---|---|---|
| 2007/0195233 A1* | 8/2007 | Hasegawa | G02F 1/133504 349/112 |
| 2012/0224355 A1 | 9/2012 | Umenaka | |
| 2013/0235312 A1* | 9/2013 | Mitsui | G02F 1/133504 349/112 |
| 2014/0340752 A1 | 11/2014 | Kusama et al. | |
| 2014/0340753 A1 | 11/2014 | Kusama et al. | |
| 2015/0355390 A1 | 12/2015 | Katagiri et al. | |
| 2016/0018571 A1 | 1/2016 | Kusama et al. | |
| 2016/0025907 A1 | 1/2016 | Kusama et al. | |
| 2016/0033692 A1 | 2/2016 | Kusama et al. | |
| 2016/0047952 A1 | 2/2016 | Kusama et al. | |
| 2016/0070035 A1 | 3/2016 | Kusama et al. | |
| 2016/0077246 A1 | 3/2016 | Kusama et al. | |
| 2017/0293054 A1 | 10/2017 | Kusama et al. | |

FOREIGN PATENT DOCUMENTS

| | | | | |
|---|---|---|---|---|
| JP | 2003255318 A | | 9/2003 | |
| JP | 2005189303 A | * | 7/2005 | |
| JP | 2004038009 A | | 2/2009 | |
| JP | 201133878 A | | 7/2011 | |
| JP | 2012141593 A | * | 7/2012 | ........... G02B 5/0257 |
| JP | 2013037337 A | * | 2/2013 | |
| JP | 2013117702 A | | 6/2013 | |
| JP | 2013117703 A | | 6/2013 | |
| JP | 2013148712 A | | 8/2013 | |
| JP | 2013210408 A | | 10/2013 | |
| JP | 2013210409 A | | 10/2013 | |
| JP | 2014002186 A | | 1/2014 | |
| JP | 2014002187 A | | 1/2014 | |
| JP | 2014002188 A | | 1/2014 | |
| JP | 2014126749 A | | 7/2014 | |
| JP | 2014126750 A | | 7/2014 | |
| JP | 2014126771 A | | 7/2014 | |
| JP | 2014191340 A | | 10/2014 | |
| JP | 2016048290 A | | 4/2016 | |

OTHER PUBLICATIONS

Miyadera et al., Light Control Film, Light Scattering Film, and Method of Manufacturing the Same, Machine Translation of JP 2013-037337 A from AIPN website, All pages.*

Orui et al., Light Diffusion Film and Manufacturing Method for Light Diffusion Film, Machine Translation of JP 2012-141593 A from AIPN website, All pages.*

* cited by examiner

FIG.9(a)
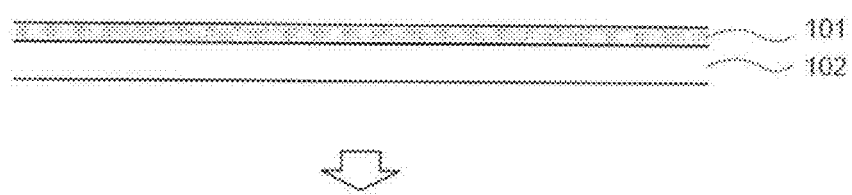
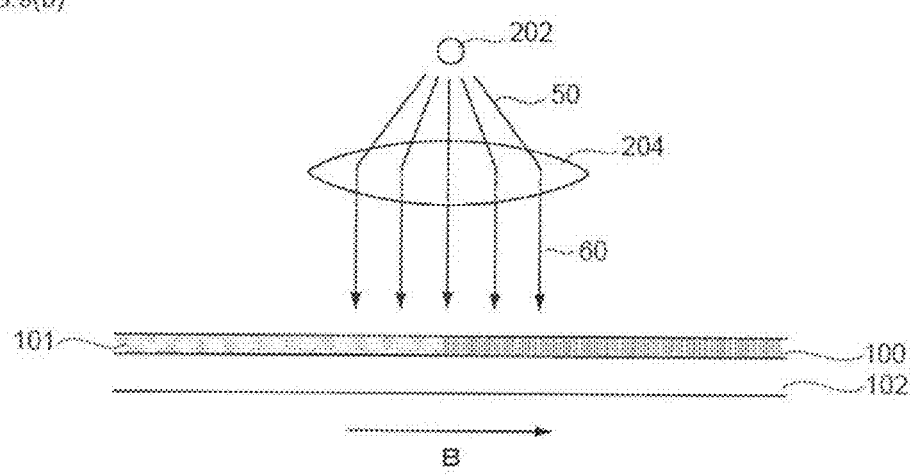
FIG.9(b)

OPTICAL-DIFFUSION FILM FOR DISPLAY AND DISPLAY DEVICE USING SAME

TECHNICAL FIELD

The present invention relates to an optical-diffusion film for display and a display device using the same.

More particularly, the present invention relates to an optical-diffusion film for display which can, when applied to a display device using a collimated backlight as the backlight for a display panel, suppress rectilinear transmission of highly directional light emitted from the collimated backlight, and efficiently diffuse and emit the emitted light to the front of the display device as image display light, and a display device using the optical-diffusion film.

BACKGROUND ART

In regard to conventional display devices, predetermined images can be displayed by utilizing a light emitted from a light source provided inside the device (internal light source; backlight unit).

Also, in recent years, in order to display an image with high front contrast while suppressing electric power consumption, there has been suggested a display device that uses an internal light source which can emit light with high parallelism that orthogonally intersects with the display surface of a display panel (hereinafter, may be referred to as collimated light) (hereinafter, the internal light source may be referred to as a collimated backlight).

With such a display device using a collimated backlight, light having high directionality can be made incident to various pixels that constitute the display panel, and therefore, light emitted from an internal light source can be efficiently emitted through the display surface side as image display light.

However, in such a display device using a collimated backlight, since directionality of image display light also increases, if the display device is used directly, there occurs a problem that the viewing angle becomes markedly narrowed.

Thus, in order to obtain a sufficient viewing angle even in the case of using a collimated backlight, an image display device in which an optical-diffusion film is laminated on the display surface side of the display panel has been disclosed (see, for example, Patent Documents 1 and 2).

That is, Patent Document 1 discloses a liquid crystal display device including a liquid crystal display panel, an optical-diffusion plate (light diffusion film) disposed on the image observing surface side of the liquid crystal display panel, and a backlight that causes a light for image observation to enter the liquid crystal display panel, characterized in that the optical-diffusion plate has a half-value angle of the output intensity distribution of 35° to 60° when parallel light is incident, and when the pixel pitch of the liquid crystal display panel is designated as p, and the thickness on the output side is designated as t, the light emitted by the backlight is a collimated light of which the half-value angle θ of the intensity distribution satisfies the formula:

"$0 < \theta \leq \tan^{-1}(p/t)$".

Furthermore, regarding the optical-diffusion plate, there has been disclosed an optical-diffusion plate in which areas other than the light transmissive parts that are regularly or irregularly dispersed are covered with a black mask.

Furthermore, Patent Document 2 discloses a liquid crystal display device including a liquid crystal cell, polarizing plates disposed on both sides of the liquid crystal cell, an optical-diffusion element (light diffusion film element) provided on the outside of the polarizing plate on the viewing side, and a backlight unit provided on the outside of the polarizing plate on the opposite side of the viewing side, in which the backlight unit is a parallel light source apparatus which emits a collimated light having a luminance half-value angle of 3° to 35° toward the liquid crystal cell, and the ratio between the optical-diffusion half-value angle Fw (FD) of the optical-diffusion element and the luminance half-value angle Fw (BL) of the collimated light, Fw (BL)/Fw (FD), is 0.5 or less.

Furthermore, regarding the optical-diffusion element, an internal diffusion type optical-diffusion element containing light diffusible fine particles in the interior, or the like has been disclosed.

CITATION LIST

Patent Document

Patent Document 1: JP 2004-38009 A (Claims, specification, and drawings)
Patent Document 2: JP 2011-133878 A (Claims and specification)

DISCLOSURE OF THE INVENTION

Problem to be Solved by the Invention

However, while the liquid crystal display devices described in Patent Documents 1 and 2 can reliably extend the viewing angle, there has been a problem that a portion of light having high directionality that has passed through the display panel may be transmitted straight through the optical-diffusion film, and so-called "glare" is prone to occur.

Furthermore, as is well-known, light emitted from a collimated backlight is not a perfectly parallel light, and in reality, the emitted light is a diffused light with the extent of diffusion being dependent on the collimation performance.

Therefore, in the case of the optical-diffusion films used in Patent Documents 1 and 2, since the angle of emission of the diffused light diffused by the optical-diffusion film is simply dependent on the incident angle of collimated light, and there is a problem that depending on the parallelism of the collimated light, it may be difficult to efficiently diffuse and emit the collimated light toward the front of the display device as image display light.

As a result, a problem can be seen that the advantage of a display device having a collimated backlight, which can display images having high front contrast while suppressing power consumption, may not be sufficiently exhibited.

On the other hand, there is known an optical-diffusion film that can control the angle of emission of diffused light, unlike the optical-diffusion films used in Patent Documents 1 and 2.

More specifically, there is known an optical-diffusion film which is formed by photocuring two or more kinds of polymerizable compounds having different refractive indices while performing phase separation of the polymerizable compounds, and has a predetermined internal structure in which regions having a relatively high refractive index and regions having a relatively low refractive index are formed in a predetermined pattern within the film.

Regarding such an optical-diffusion film, known examples include the optical-diffusion film having a louver structure in which plural plate-shaped regions having different refractive indices are alternately arranged along any one arbitrary direction along the film plane (meaning a plane other than a cross-section of the film; the same applies in the following), and an optical-diffusion film having a columnar structure in which plural pillar-shaped objects having a relatively high refractive index are arranged to stand close together in a region having a relatively low refractive index within the film.

However, in a case in which the aforementioned optical-diffusion film having a louver structure is used as an optical-diffusion film of a display device having a collimated backlight, since the optical-diffusion film anisotropically diffuses incident light, there is a problem that, for example, although image display light can be diffused sufficiently in the horizontal direction of the display, image display light can be hardly diffused in the vertical direction.

Furthermore, the problems described above can be solved by laminating plural optical-diffusion films so as to stagger anisotropy; however, in that case, not only it is economically disadvantageous due to the increased number of bonding processes, but also the total layer thickness of the optical-diffusion layer becomes excessively thick. Therefore, there is a problem that blurring easily occurs in the displayed image, and also, a physical problem of delamination is also prone to occur.

On the other hand, when an optical-diffusion film having the aforementioned columnar structure is used as the optical-diffusion film of a display device having a collimated backlight, since incident light can be diffused isotropically, even if a single layer is used, image display light can be diffused in the vertical direction as well as in the horizontal direction of the display.

However, in the case of an optical-diffusion film having a columnar structure, straight transmitted light may not be suppressed stably with a single layer, and there can be seen a problem that after all, plural optical-diffusion films should be laminated.

Therefore, there has been a demand for a display device which, despite using an optical-diffusion film composed of a single layer, can efficiently diffuse and emit a highly directional light emitted from a collimated backlight, toward the front of the display device as image display light.

Thus, the inventors of the present invention conducted a thorough investigation in view of such circumstances as described above, and the inventors found that the problems described above can be solved by using an optical-diffusion film which is a single-layered film having a predetermined internal structure and has a predetermined film thickness and predetermined optical-diffusion characteristics, as an optical-diffusion film of a display device using a collimated backlight. Thus, the inventors have accomplished the present invention.

That is, an object of the present invention is to provide an optical-diffusion film for display which, particularly when applied to a display device that uses a collimated backlight as a backlight of the display panel, can suppress straight transmission of a highly directional light emitted from the collimated backlight and can efficiently diffuse and emit the highly directional light to the front of the display device as image display light, and a display device using the optical-diffusion film.

Means for Solving Problem

According to an aspect of the present invention, there is provided an optical-diffusion film for display, which is a single-layered optical-diffusion film having a columnar structure in which plural pillar-shaped objects having a relatively high refractive index are arranged to stand close together along the film thickness direction in a region having a relatively low refractive index, and in which the film thickness of the optical-diffusion film has a value within the range of 60 to 700 μm, and the haze value obtainable when light is incident in the normal line direction of the film plane has a value of 80% or more. Thus, the problems described above can be solved.

That is, when the optical-diffusion film for display of the present invention is used, since the film is an optical-diffusion film composed of a single layer having a predetermined film thickness, the number of bonding processes can be reduced, and it is economically advantageous, as compared with the case of laminating plural optical-diffusion films. In addition to that, the occurrence of blurring in the displayed image or the occurrence of delamination can also be suppressed effectively.

On the other hand, since the relevant optical-diffusion film has a predetermined internal structure and also has predetermined optical-diffusion characteristics, despite that the film is composed of a single layer, when the optical-diffusion film is applied to a display device using a collimated backlight as a backlight of the display panel, the optical-diffusion film can suppress straight transmission of a highly directional light emitted from the collimated backlight and can efficiently diffuse and emit the highly directional light to the front of the display device as image display light.

Meanwhile, the term "single layer" means that plural sheets of optical-diffusion films are not laminated, and the case in which plural layers of internal structures are formed within one sheet of optical-diffusion film is also included in the "single layer".

On the occasion of configuring the optical-diffusion film for display of the present invention, it is preferable that when one of the surfaces of the optical-diffusion film is designated as a first surface, and the other surface is designated as a second surface, the pillar-shaped objects are modified pillar-shaped objects that have their shape changed from the first surface toward the second surface.

When such a configuration is adopted, predetermined optical-diffusion characteristics can be imparted more stably to the optical-diffusion film.

Furthermore, on the occasion of configuring the optical-diffusion film for display of the present invention, it is preferable that in regard to the modified pillar-shaped objects, the diameter increases from the first surface toward the second surface.

When such a configuration is adopted, predetermined optical-diffusion characteristics can be imparted even more stably to the optical-diffusion film.

Furthermore, on the occasion of configuring the optical-diffusion film for display of the present invention, it is preferable that the modified pillar-shaped objects have a bent part in the middle of the pillar-shaped objects.

When such a configuration is adopted, predetermined optical-diffusion characteristics can be imparted more stably to the optical-diffusion film.

Furthermore, on the occasion of configuring the optical-diffusion film for display of the present invention, it is preferable that the modified pillar-shaped objects are composed of first pillar-shaped objects positioned on the first surface side, and second pillar-shaped objects positioned on the second surface side.

When such a configuration is adopted, predetermined optical-diffusion characteristics can be imparted more stably to the optical-diffusion film, and also, the optical-diffusion characteristics thus obtainable can be efficiently controlled.

Furthermore, on the occasion of configuring the optical-diffusion film for display of the present invention, it is preferable that the optical-diffusion film is formed by photocuring a composition for optical-diffusion film including a (meth)acrylic acid ester containing plural aromatic rings as component (A), a urethane(meth)acrylate as component (B), and a photopolymerization initiator as component (C).

When such a configuration is adopted, the component (A) and the component (B) can be photocured while the components are efficiently phase-separated, and therefore, predetermined optical-diffusion characteristics can be imparted even more stably to the optical-diffusion film.

According to another aspect of the present invention, there is provided a display device using a collimated backlight as a backlight of the display panel, the display panel having an optical-diffusion film laminated on the display surface side or the non-display surface side of the display panel, characterized in that the optical-diffusion film is a single-layered optical-diffusion film having a columnar structure in which plural pillar-shaped objects having a relatively high refractive index are arranged to stand close together in the film thickness direction in a region having a relatively low refractive index, the film thickness of the optical-diffusion film has a value within the range of 60 to 700 μm, and the haze value obtainable when light is incident in the normal line direction of the film plane has a value of 80% or more.

That is, when the display panel of the present invention is used, since the display panel includes a predetermined optical-diffusion film, when the optical-diffusion film is laminated on the display surface side of the display panel, the display panel can suppress straight transmission of a highly directional light emitted from a collimated backlight and can efficiently diffuse and emit the highly direction light to the front of the display device as image display light.

Furthermore, when a predetermined optical-diffusion film is laminated on the non-display surface side of the display panel, that is, between the display panel and the collimated backlight, the directionality of the light emitted from the collimated backlight can be regulated to a suitable range and then made incident to the display panel.

Furthermore, on the occasion of configuring the display device of the present invention, it is preferable that half-value width of the light emitted from the collimated backlight has a value of 40° or less.

Even if such a configuration is adopted, the display device can suppress straight transmission of a highly directional light emitted from the collimated backlight and can efficiently diffuse and emit the highly directional light to the front of the display device as image display light.

Furthermore, on the occasion of configuring the display device of the present invention, it is preferable that the display panel is a semi-transmissive display panel.

When such a configuration is adopted, there can be obtained a semi-transmissive display device which can suppress straight transmission of a highly directional light emitted from a collimated backlight and efficiently diffuse and emit the emitted light to the front of the display device as image display light in an environment with insufficient external light, and can display an image using external light in an environment with sufficient external light.

BRIEF DESCRIPTION OF DRAWINGS

FIGS. 9(a) and 9(b) are diagrams provided to explain the various steps in the method for producing an optical-diffusion film.

MODE(S) FOR CARRYING OUT THE INVENTION

According to an embodiment of the present invention, there is provided an optical-diffusion film for display, which is a single-layered optical-diffusion film having a columnar structure in which plural pillar-shaped objects having a relatively high refractive index are arranged to stand close together in the film thickness direction in a region having a relatively low refractive index, and in which the film thickness of the optical-diffusion film has a value within the range of 60 to 700 μm, and the haze value obtainable when light is incident in the normal line direction of the film plane has a value of 80% or more.

According to another embodiment of the present invention, there is provided a display device which uses the optical-diffusion film for display described above, and also uses a collimated backlight as a backlight of the display panel.

Hereinafter, these embodiments will be explained specifically with appropriate reference to the drawings.

However, basically the display device of the present invention is explained, and the optical-diffusion film for display of the present invention is explained as one constituent element of the display device.

Furthermore, for the convenience of explanation, the case of using a liquid crystal display panel as the display panel is primarily described.

1. Basic Configuration of Display Device

First of all, the basic configuration of the display device of the present invention is described.

Figure 1:
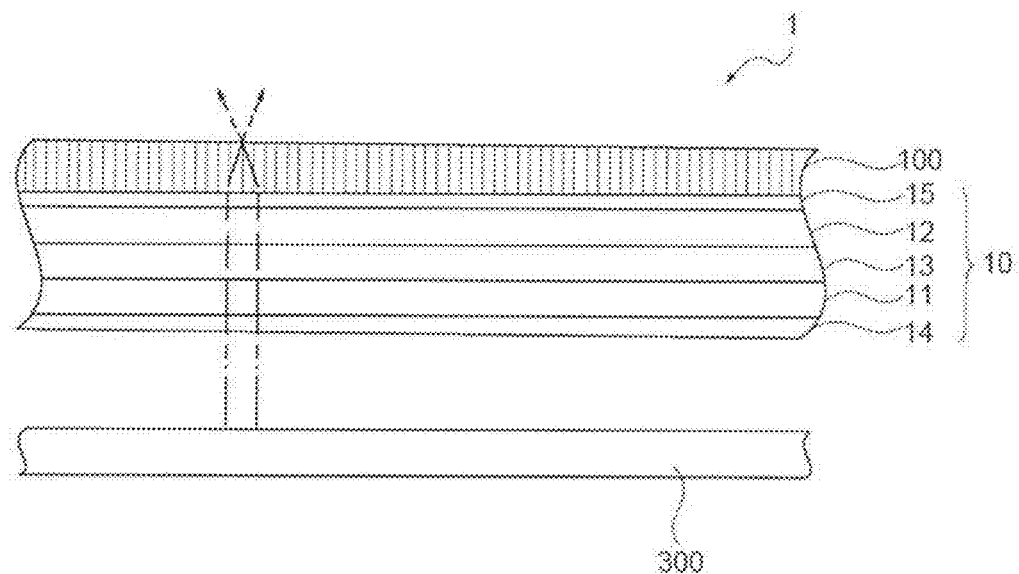
FIG. 1 is a diagram provided to explain the configuration of a display device of the present invention.

As illustrated in FIG. 1, the display device 1 includes a liquid crystal display panel 10 as an image display panel; a backlight 300 that causes a collimated light for image display to enter the liquid crystal display panel 10; an optical-diffusion film 100 that diffuses an image-carrying light that has passed through the liquid crystal display panel 10; and a driving circuit (not shown in the diagram) that drives the liquid crystal display panel 10 according to an image signal.

Furthermore, the liquid crystal display panel 10 has an opening for image display, and optionally has various members that are included in a known liquid crystal display device, such as a casing for accommodating members such as a backlight 300, a liquid crystal display panel 10, an optical-diffusion film 100, and a driving circuit, while maintaining the members at predetermined positions.

In regard to such a display device, when a collimated light is emitted from the backlight 300 enters and passes through the liquid crystal display panel 10 that is modulation driven according to the displayed image, similarly to a conventional liquid crystal display device, the collimated light becomes an image-carrying light, and this image-carrying collimated light is diffused by the optical-diffusion film 100. Thus, an image is displayed.

Incidentally, FIG. 1 describes an example of laminating an optical-diffusion film on the display surface side of the display panel; however, the optical-diffusion film may also be laminated on the non-display surface side of the display panel.

Furthermore, FIG. 1 describes a transmissive display device as an example; however, the display device of the present invention can also be configured as a semi-transmissive display device using a semi-transmissive display panel as the display panel.

2. Display Panel

As illustrated in FIG. 1, the liquid crystal display panel 10 as the display panel is a known liquid crystal display panel 10 used in various liquid crystal display devices.

Therefore, for example, as illustrated in FIG. 1, the liquid crystal display panel has a configuration in which a liquid crystal layer 13 formed by filling a liquid crystal between two sheets of glass substrates (11, 12) is provided, and polarizing plates (14, 15) are disposed on the reverse surface of the liquid crystal layer 13 in the two glass substrates (11, 12).

Furthermore, various optical compensation films such as a phase compensation film may also be optionally disposed between the glass substrates (11, 12) and the polarizing plates (14, 15).

Meanwhile, regarding the kind of the liquid crystal used in the liquid crystal layer 13, a nematic liquid crystal, a cholesteric liquid crystal, a smectic liquid crystal, a blue phase liquid crystal, a ferroelectric liquid crystal, and the like can be used.

Furthermore, the liquid crystal display panel 10 may be a color display panel or a monochromatic display panel, and there are no particular limitations on the liquid crystal cell, the driving means (switching element) such as a thin film transistor (TFT), the black matrix (BM), and the like.

Also, in regard to the operation mode, all kinds of operation modes such as a TN (Twisted Nematic) mode, a STN (Super Twisted Nematic) mode, an ECB (Electrically Controlled Birefringence) mode, an IPS (In-Plane Switching) mode, a super-IPS mode, and a MVA (Multidomain Vertical Alignment) mode can be utilized.

Furthermore, it is preferable that the display panel is a semi-transmissive display panel, and it is particularly preferable that the display panel is a semi-transmissive liquid crystal display panel.

The reason for this is that when a semi-transmissive display panel is used, there can be obtained a semi-transmissive display device in which, in an environment with insufficient external light, straight transmission of a highly directional light emitted from a collimated backlight can be suppressed, and the emitted light can be efficiently diffused and emitted to the front of the display device as image display light, while in an environment with sufficient external light, images can be displayed by utilizing external light.

Here, the semi-transmissive liquid crystal display panel is a system designed to make an image satisfactorily visible both indoors and outdoors, and generally, a semi-transmissive liquid crystal display panel has a transmission region and a reflection region within one pixel.

Among these, the transmission region has a transmitting electrode, and the display panel exhibits a function as a transmissive liquid crystal display device by transmitting the light emitted from the backlight in the transmitting electrode.

On the other hand, the reflection region has a reflecting electrode, and the display panel exhibits a function as a reflective liquid crystal display device by reflecting external light in the reflection region.

Furthermore, there is also available a semi-transmissive liquid crystal display panel which does not delimit the pixels into transmission regions and reflection regions, but utilizes transmission and reflection of light by means of a reflective polarizing plate, and this is also applicable.

3. Backlight

As illustrated in FIG. 1, the backlight 300 in the display device 1 of the present invention is characterized by being a collimated backlight which can emit a collimated light that orthogonally intersects with the display surface of the display panel 10.

The reason for this is that with a collimated backlight, an image having high front contrast can be displayed while power consumption is suppressed.

That is, when a collimated backlight is used, a light having high directionality can be made incident to the various pixels that constitute the display panel, and therefore, the light coming from the backlight can be emitted efficiently toward the display surface side as image display light.

Regarding such a collimated backlight, various conventionally known collimated backlights can be used as long as they can emit a collimated light that orthogonally intersects with the display surface of the display panel.

Figure 2:
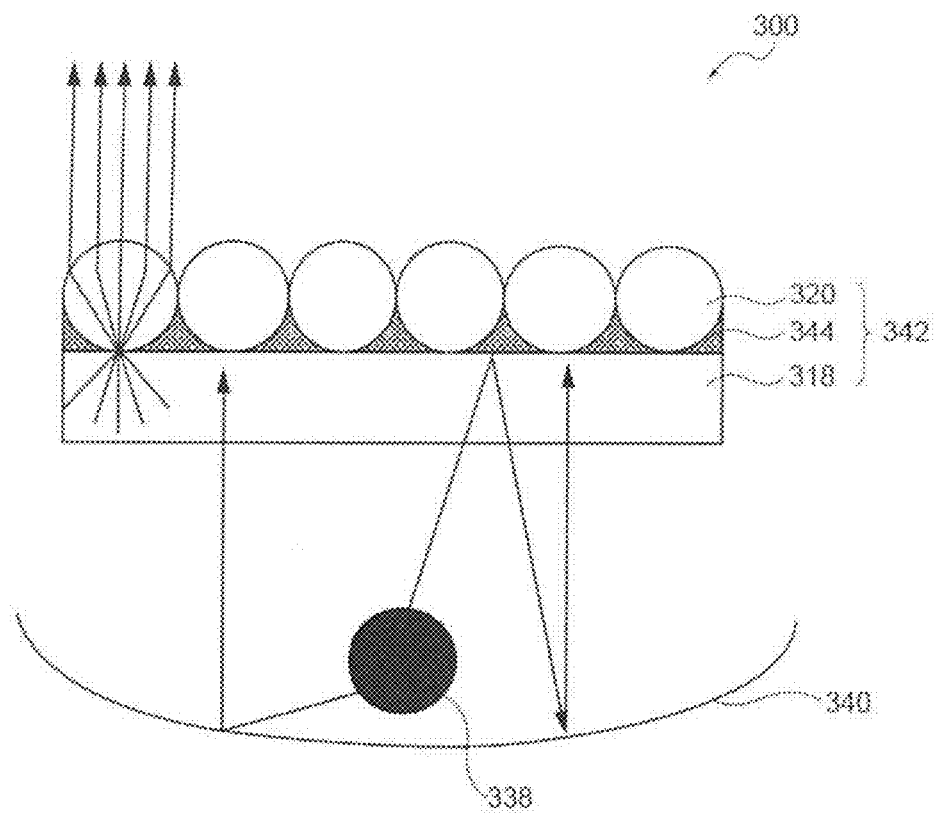
FIG. 2 is a diagram provided to explain a collimated backlight.

An example thereof is the collimated backlight 300 illustrated in FIG. 2.

That is, the collimated backlight 300 is composed of a high luminance lamp 338, a reflective plate 340, and a collimating plate 342.

The light emitted from the high luminance lamp 338 is converted to collimated light either directly or after being reflected at the reflective plate 340, and the collimated light is caused to enter the display panel 10.

Furthermore, the collimating plate 342 is a product produced by fixing spherical beads 320 that are light-transmissive and have a size that is unrecognizable by a viewer, onto a supporting sheet 318 by means of an optical-diffusion reflective binder 344, while a portion of the beads are brought into contact with the supporting sheet 318. The collimating plate 342 is disposed such that the supporting sheet 318 faces towards the high luminance lamp 338 side, and the beads 320 face towards the display panel 10 side.

Incidentally, suitable examples of the optical-diffusion reflective binder 344 include adhesives having fine particles of light diffusing substances dispersed therein.

Suitable examples of such light diffusing substances include one or more kinds of fine particles of yttrium oxide ($Y_2O_3$), zirconium oxide ($ZrO_2$), gadolinium oxide ($Gd_2O_3$), lanthanum oxide ($La_2O_3$), hafnium oxide ($HfO_2$), barium sulfate ($BaSO_4$), alumina ($Al_2O_3$), and titanium oxide ($TiO_2$).

Furthermore, in regard to the collimating plate 342, the light emitted from the high luminance lamp 338 and made incident to the collimating plate 342 directly or after being reflected at the light reflective plate 340 is such that as illustrated in FIG. 2, only the light incident to the contact points between the beads 320 and the supporting sheet 318 enters the beads 320, is refracted, and is emitted as collimated light.

Furthermore, light that has entered sites other than the contact points mentioned above, that is, the binder 344, is diffused and reflected by the binder 344, subsequently enters the light reflective plate 340, is reflected again, and enters the collimating plate 342.

Furthermore, it is preferable that the half-value width of the light emitted from the collimated backlight is adjusted to a value of 40° or less.

The reason for this is that since the display device of the present invention includes a predetermined optical-diffusion film that will be described below, straight transmission of a highly directional light emitted from the collimated backlight is suppressed, and the highly directional light can be efficiently diffused and emitted to the front of the display device as image display light.

That is, if such a half-value width has a value of above 40°, the collimation performance in the backlight is excessively decreased, and it is made difficult for the highly directional light to efficiently enter the various pixels that constitute the display panel, so that it may be difficult for the light coming from the backlight to be emitted efficiently through the display surface side as image display light.

More specifically, fluctuation in the brightness for the image display light, or glare may easily occur.

Therefore, it is more preferable that the half-value width of the light emitted from the collimated backlight is adjusted to a value of 30° or less, and even more preferably to a value of 20° or less.

Meanwhile, the half-value width of the emitted light means the luminance half-value width of the emitted light.

4. Optical-diffusion Film

When the optical-diffusion film 100 is laminated on the display surface side of the display panel 10, the optical-diffusion film 100 has a function of suppressing straight transmission of a highly directional incident light emitted from the collimated backlight 300, which has been transmitted through the various pixels in the display panel 10, and efficiently diffusing and emitting the incident light to the front of the display device as image display light.

Furthermore, when the optical-diffusion film 100 is laminated on the non-display surface side of the display panel 10, that is, between the display panel 10 and the collimated backlight 300, the optical-diffusion film 100 also contributes in regulating the directionality of the light emitted from the collimated backlight 300 to a suitable range, and then causing the emitted light to enter the display panel 10.

Furthermore, the display device of the present invention is characterized by having such an optical-diffusion film.

That is, the optical-diffusion film according to the present invention is characterized by being a single-layered optical-diffusion film having a predetermined internal structure, and having a predetermined film thickness and predetermined optical-diffusion characteristics.

In the following, the optical-diffusion film according to the present invention will be specifically explained.

(1) Basic Principle of Optical-diffusion in Optical-diffusion Film

The optical-diffusion film according to the present invention is an optical-diffusion film having a columnar structure in which plural pillar-shaped objects having a relatively high refractive index are arranged to stand close together in the film thickness direction in a region having a relatively low refractive index.

Therefore, first of all, the basic principle of such an optical-diffusion film will be explained using FIGS. 3 and 4.

First, FIG. 3(*a*) shows a top view (plan view) of the optical-diffusion film 100, and FIG. 3(*b*) shows a cross-sectional view of the optical-diffusion film 100 obtainable when the optical-diffusion film 100 illustrated in FIG. 3(*a*) is cut in a vertical direction along the dotted line A-A, and the cut surface is viewed from the direction indicated by the arrow.

Figure 4A:
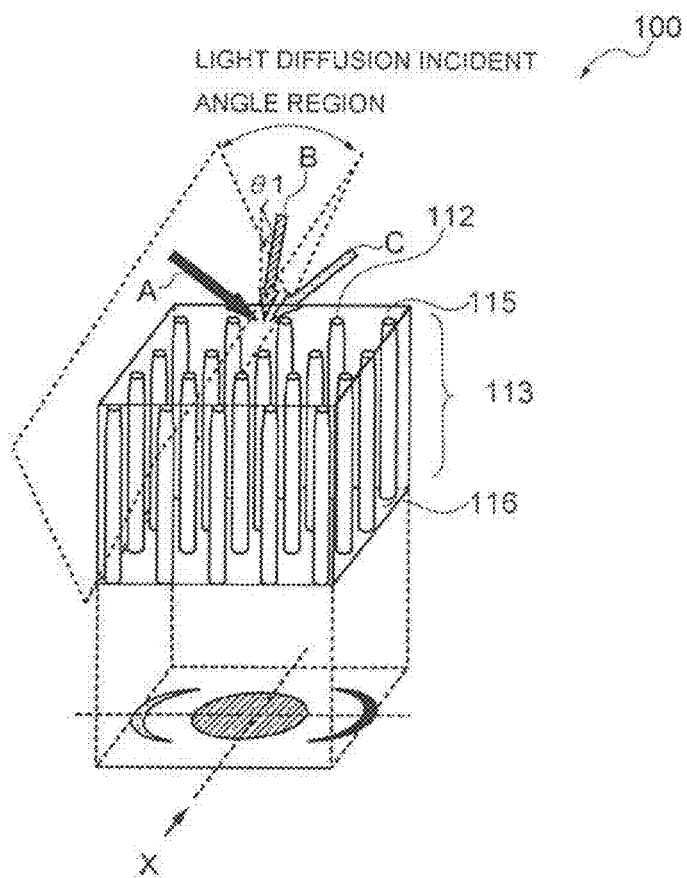
FIGS. 4(a) and 4(b) are diagrams provided to explain the incident angle dependency and isotropic optical-diffusion in an optical-diffusion film having a columnar structure in the film.
Figure 4B:
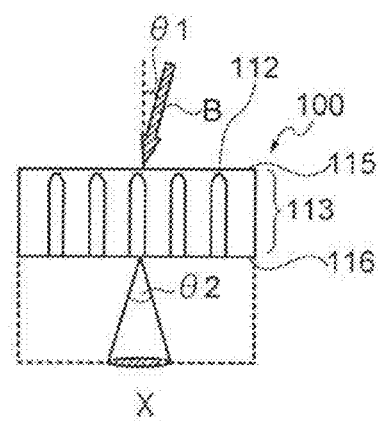

Furthermore, FIG. 4(*a*) shows an overall view of the optical-diffusion film 100, and FIG. 4(*b*) shows a cross-sectional view obtainable when the optical-diffusion film 100 of FIG. 4(*a*) is viewed in the X-direction.

As can be seen from such a plan view of FIG. 3(*a*), the optical-diffusion film 100 has a columnar structure 113 composed of pillar-shaped objects having a relatively high refractive index 112 and a region having a relatively low refractive index 114.

Furthermore, as can be seen from the cross-sectional view of FIG. 3(*b*), in the vertical direction of the optical-diffusion film 100, the pillar-shaped objects having a relatively high refractive index 112 and the region having a relatively low refractive index 114 respectively have a predetermined width and are in a state of being alternately disposed.

Thereby, it is speculated that, as illustrated in FIG. 4(*a*), when the incident angle is within the optical-diffusion incident angle region, the incident light is diffused by the optical-diffusion film 100.

That is, as illustrated in FIG. 3(*b*), it is speculated that when the incident angle of incident light to the optical-diffusion film 100 has a value from parallel to a predetermined angle range, that is, a value within the optical-diffusion incident angle region, with respect to the boundary surface 113*a* of the columnar structure 113, the incident light (152, 154) escapes from the interior of the pillar-shaped objects having a relatively high refractive index 112 in the columnar structure, along the film thickness direction while changing its direction, and thus the direction of propagation of light at the light exit surface side is not even.

As a result, when the incident angle is within the optical-diffusion incident angle region, it is speculated that incident light is diffused by the optical-diffusion film 100 and turns into diffused light (152', 154').

On the other hand, in a case in which the incident angle of incident light with respect to the optical-diffusion film 100 is not in the optical-diffusion incident angle region, it is speculated that, as illustrated in FIG. 3(*b*), the incident light 156 directly penetrates the optical-diffusion film 100, without being diffused by the optical-diffusion film, and turns into transmitted light 156'.

Meanwhile, the term "optical-diffusion incident angle region" as used in the present invention means the angle range of incident light corresponding to the emission of diffused light when the angle of incident light emitted from a point light source is changed in the optical-diffusion film.

Furthermore, such a "optical-diffusion incident angle region" represents, as illustrated in FIG. 4(*a*), an angle region determined uniquely for each optical-diffusion film, based on the difference in the refractive index, the angle of inclination or the like of the columnar structure in the optical-diffusion film.

According to the basic principle described above, the optical-diffusion film 100 having the columnar structure 113 is capable of exhibiting, for example, incident angle dependency in transmission and diffusion of light as illustrated in FIG. 4(*a*).

As illustrate in FIG. 3 and FIG. 4, an optical-diffusion film having the columnar structure 113 usually has "isotropy".

Here, the term "isotropy" as used in the present invention means that, as illustrated in FIG. 4(*a*), when incident light is diffused by a film, the optical-diffusion film has a property that the diffusion condition (shape of the spreading of diffused light) of the emitted light that has been diffused in a plane parallel to the film (meaning a plane parallel to any plane other than a cross-section of the film; hereinafter, the same applies) does not vary with the direction in the same plane.

More specifically, as illustrated in FIG. 4(*a*), when incident light is diffused by a film, the diffusion condition of the emitted light that has been diffused is circular in shape within a plane parallel to the film.

Furthermore, as illustrated in FIG. 4(*b*), when the term "incident angle θ1" of incident light is used in the present invention, the incident angle θ1 means the angle (°) obtainable in a case in which the angle of the incident light with respect to the normal line to the incident side surface of the optical-diffusion film is designated as 0°.

Furthermore, according to the present invention, the term "optical-diffusion angle region" means the angle range of diffused light obtainable when a point light source is fixed at an angle at which incident light is diffused most in an optical-diffusion film.

Furthermore, according to the present invention, the "angle of aperture of diffused light" is the width of angle (°) of the "optical-diffusion angle region" described above, and means the angle of aperture of diffused light θ2 in a case in which a cross-section of the film is viewed as illustrated in FIG. 4(*b*).

Meanwhile, it has been recognized that the width of angle (°) of the optical-diffusion angle region and the width of the optical-diffusion incident angle region are approximately equal.

Furthermore, as illustrated in FIG. 4(*a*), in an optical-diffusion film, when incident angles of incident light are included in the optical-diffusion incident angle region, even if the incident angles are different, almost the same optical-diffusion can be achieved in the light exit surface side.

Therefore, it can be said that the resulting optical-diffusion film has a light-converging effect of concentrating light into a predetermined site.

Figure 3A:
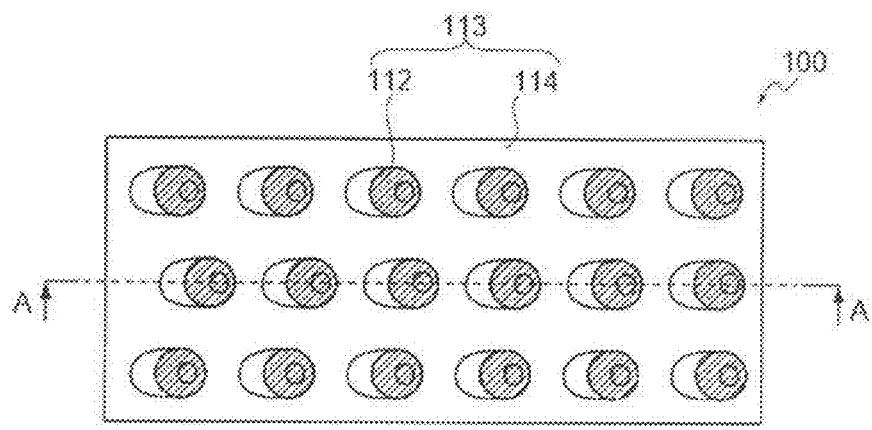
FIGS. 3(a) and 3(b) are diagrams provided to explain an outline of an optical-diffusion film having a columnar structure in the film.
Figure 3B:
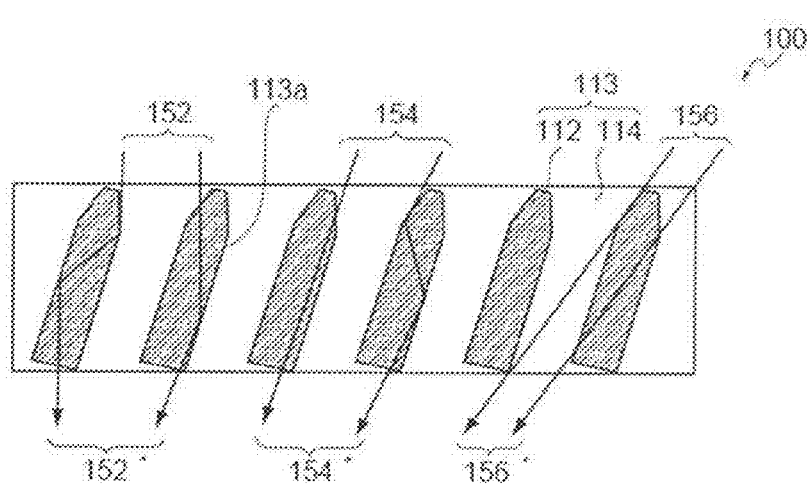

Incidentally, regarding the change of direction of incident light in the interior of the pillar-shaped objects 112 in the columnar structure, the case in which the change of direction is of step-index type, with the direction being changed from a straight line form to a zigzag form due to total reflection as illustrated in FIG. 3(b), as well as the case in which the change of direction is of gradient-index type, with the direction being changed to a curved from, may be considered.

Furthermore, in FIGS. 3(a) and 3(b), the boundary surface between the pillar-shaped objects having a relatively high refractive index 112 and the region having a relatively low refractive index 114 is indicated using a straight line for the purpose of simplicity; however, in reality, the interface is slightly meandering, and each of the pillar-shaped objects forms a complicated refractive index distribution structure accompanied by branching or disappearance.

As a result, it is speculated that a non-even distribution of optical characteristics increases light diffusibility.

(2) Single Layer

Furthermore, the optical-diffusion film according to the present invention is characterized by being a single layer.

The reason for this is that the number of bonding processes can be reduced so that it is economically advantageous, as compared with the case of laminating plural optical-diffusion films, and also, the occurrence of blurring in the displayed image or the occurrence of delamination can also be suppressed effectively.

Meanwhile, in addition to the case in which plural optical-diffusion films are directly laminated, the case in which plural optical-diffusion films are laminated with other films and the like interposed therebetween, is also included in the case of having plural optical-diffusion films laminated.

(3) Optical-diffusion Characteristics

Figure 5:
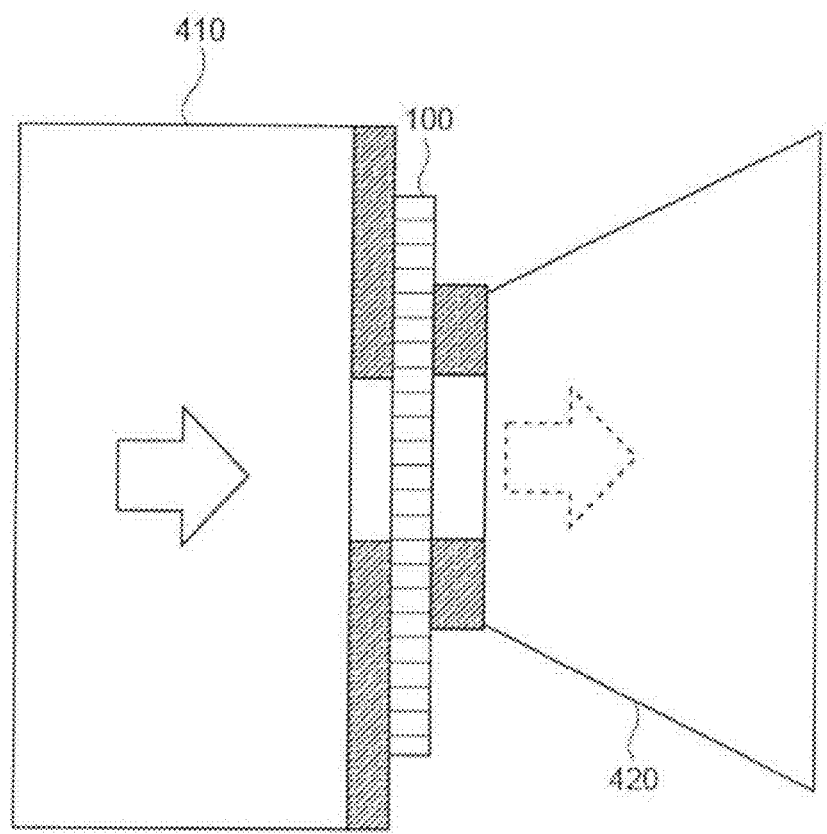
FIG. 5 is a diagram provided to explain the method for measuring a haze value of an optical-diffusion film.

The optical-diffusion film according to the present invention is characterized in that, as illustrated in FIG. 5, the haze value obtainable in the case in which light is incident in the normal line direction of the film plane, that is, in the case in which the incident angle $\theta 1=0°$, has a value of 80% or more.

The reason for this is that when the optical-diffusion film has such predetermined optical-diffusion characteristics, despite that the film is composed of a single layer, a highly directional light emitted from a collimated backlight can be efficiently diffused and emitted toward the front of the display as image display light.

That is, it is because if such a haze value has a value of below 80%, a portion of the highly directional light that has passed through the display panel may penetrate straight through the optical-diffusion film, and so-called "glare" is prone to occur.

Therefore, it is preferable that the haze value obtainable when light is made incident in the normal line direction of the film plane, that is, when the incident angle $\theta 1=0°$, is adjusted to a value of 83% or more, and even more preferably to a value of 85% or more.

Furthermore, it has been confirmed that usually, when the optical-diffusion characteristics described above are satisfactory on one surface of the film, the optical-diffusion characteristics are also satisfactory in the other surface; however, it has been confirmed that even in a case in which the optical-diffusion characteristics are satisfactory on only one surface, the effects of the present invention are obtained. Thus, it is needless to say that this is also included in the scope of the present invention.

Incidentally, FIG. 5 is a lateral view illustrating the situation in which the haze value obtainable in the case in which light is made incident in the normal line direction of the film plane, that is, in the case in which the incident angle $\theta 1=0°$, is measured using a light source 410 and an integrating sphere 420.

Figure 6A:
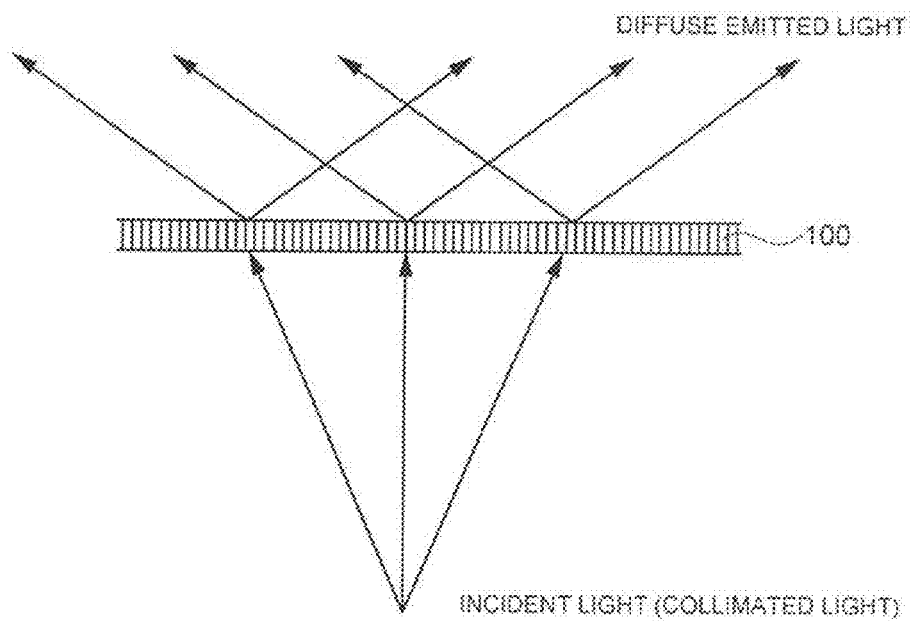
FIGS. 6(a) and 6(b) are diagrams provided to explain the relationship between the incidence of collimated light and the diffuse emission of the light.
Figure 6B:
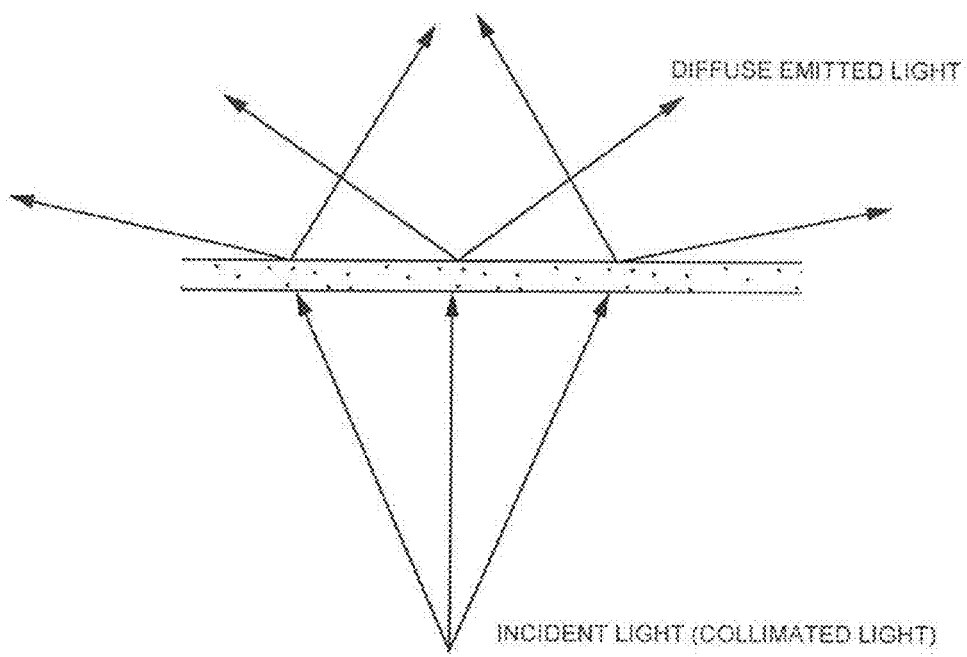

Next, the relationship between the incidence of collimated light to the optical-diffusion film, and emission of the collimated light is explained using FIGS. 6(a) and 6(b).

FIG. 6(a) shows a lateral view for explaining the relationship between the incidence of collimated light to the optical-diffusion film according to the present invention and the emission of the collimated light, and FIG. 6(b) shows a lateral view for explaining the relationship between the incidence of collimated light to an optical-diffusion film of a type containing light diffusible fine particles in the interior, and the emission of the collimated light.

First, as illustrated in FIGS. 6(a) and 6(b), a collimated light as incident light is not perfectly parallel light as is well known, and in reality, the collimated light is a light that is diffused according to the extent of the collimation performance.

Under such a presumption, as illustrated in FIG. 6(a), when a collimated light is incident to the optical-diffusion film according to the present invention, even if there is a certain degree of aperture in the incident angle of the collimated light, optical-diffusion that is almost similar can be achieved on the emission surface side, as described in the section for the basic principle of optical-diffusion in the optical-diffusion film.

Therefore, it is understood that when the optical-diffusion film according to the present invention is used, incident light coming from a collimated backlight can be efficiently diffused and emitted toward the front of the display device as image display light.

In this regard, as illustrated in FIG. 6(b), when a collimated light is made incident to an optical-diffusion film of a type containing light diffusible fine particles in the interior, even if the haze value is adjusted to a predetermined haze value or more by adding a relatively large amount of fine particles, the angle of emission of diffused light diffused by the optical-diffusion film is simply dependent on the incident angle of the collimated light.

Therefore, it is understood that when there is a certain degree of aperture in the incident angle of the collimated light, a light having a relatively high parallelism and a light having a relatively low parallelism have different angles of emission, it is difficult to efficiently diffuse and emit the incident light coming from the collimated backlight toward the front of the display device as image display light, and the front of the display device becomes dark.

In addition to that, since a relatively large amount of fine particles have been added, the optical-diffusion angle region spreads excessively, and the front of the display device becomes even darker.

As described above, since the optical-diffusion film according to the present invention has optical-diffusion characteristics that are defined by a predetermined haze value and also has a predetermined internal structure, effects originating from these two configurations can be obtained, and also, a highly directional light emitted from the collimated backlight can be efficiently diffused and emitted toward the front of the display device as image display light, without allowing straight transmission of the light.

(4) Internal Structure

The optical-diffusion film according to the present invention is characterized by having a columnar structure in which plural pillar-shaped objects having a relatively high refractive index are arranged to stand close together in the film thickness direction in a region having a relatively low refractive index.

The reason for this is that when an optical-diffusion film having such an internal structure is used, the optical-diffusion characteristics defined by a predetermined haze value can be imparted relatively easily, and therefore, straight transmission of a highly directional light emitted from a collimated backlight can be suppressed stably.

Furthermore, when an optical-diffusion film having such an internal structure is used, even if there is a certain degree of aperture in the incident angle of collimated light, the collimated light can be efficiently diffused and emitted toward the front of the display device as image display light.

Also, unlike an optical-diffusion film having a louver structure, since the optical-diffusion film can isotropically diffuse incident light, even if a single layer is used, the image display light can be diffused in the vertical direction as well as in the horizontal direction of the display.

However, from the viewpoint of stably manifesting optical-diffusion characteristics that are defined by a predetermined haze value, it is preferable that the pillar-shaped objects constituting the columnar structure of the optical-diffusion film according to the present invention are modified pillar-shaped objects in which, when one surface of the optical-diffusion film is designated as a first surface, and the other surface is designated as a second surface, the pillar-shaped objects undergo shape change from the first surface toward the second surface.

The reason for this is that, in the case of an optical-diffusion film having a columnar structure composed of conventional pillar-shaped objects that do not undergo shape change from the first surface toward the second surface, it is confirmed that the optical-diffusion characteristics defined by the predetermined haze value described above may not be obtained stably.

In the following, the columnar structure composed of modified pillar-shaped objects will be described specifically.

More specifically, as illustrated in FIG. 4(a), it is preferable that in the modified pillar-shaped objects 112, the diameter increases from the first surface 115 toward the second surface 116.

The reason for this is that by forming such a columnar structure having modified pillar-shaped objects, predetermined optical-diffusion characteristics can be imparted more stably to the optical-diffusion film.

That is, for example, it is because when light is incident from the larger diameter side of the pillar-shaped objects in the columnar structure, as the diameter on the light exit side in the modified pillar-shaped objects becomes smaller, straight transmission of light occurs with more difficulties.

Incidentally, it has been confirmed that even when light is incident from the smaller diameter side of the modified pillar-shaped objects in the columnar structure, it is difficult for straight transmission of light to occur.

Figure 7A:
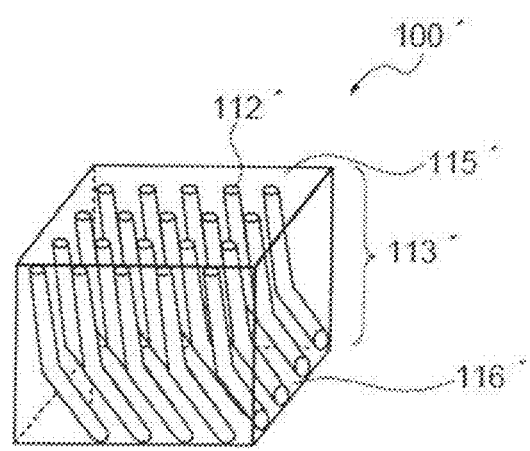
FIGS. 7(a) and 7(b) are other diagrams provided to explain an optical-diffusion film having a columnar structure in the film.

Furthermore, as illustrated in FIG. 7(a), it is preferable that the modified pillar-shaped objects 112' have a bent part in the middle of the pillar-shaped objects.

The reason for this is that when a columnar structure having such modified pillar-shaped objects is formed, predetermined optical-diffusion characteristics can be imparted more stably to the optical-diffusion film.

That is, it is because when there is a bend in the middle of the pillar-shaped objects, even if light is made incident in a direction following the inclination of any portion below or above the bent part, it is more difficult for straight transmission of light to occur.

Figure 7B:
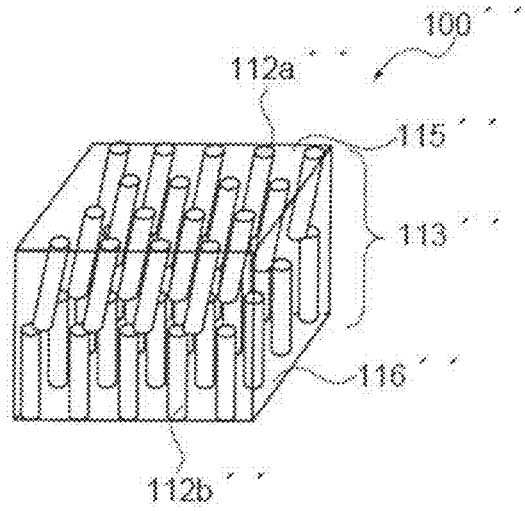

Furthermore, as illustrated in FIG. 7(b), it is preferable that the modified pillar-shaped objects 112" are composed of first pillar-shaped objects 112a" positioned on the side of the first surface 115", and second pillar-shaped objects 112b" positioned on the side of the second surface 116".

The reason for this is that when a columnar structure having such modified pillar-shaped objects is formed, predetermined optical-diffusion characteristics can be imparted more stably to the optical-diffusion film, and also, the optical-diffusion characteristics thus obtained can be controlled efficiently.

That is, it is because when the columnar structure has the first and second pillar-shaped objects, even if light is made incident in a direction following the inclination of any of the pillar-shaped objects, it is more difficult for straight transmission of light to occur.

Furthermore, it is also preferable to have an overlapping columnar structure region in which the upper end of the second pillar-shaped objects and the lower end of the first pillar-shaped objects are formed to be overlapping alternately as in the case of the optical-diffusion film of Example 4 described below.

The reason for this is that when such an overlapping columnar structure region is included, the occurrence of scattered light in a pillar-shaped object-unformed portion between the first and second pillar-shaped objects can be suppressed, and uniformity of the intensity of diffused light within the optical-diffusion angle region can be further enhanced.

(4)-1 Refractive Index

In regard to the columnar structure, it is preferable that the difference between the refractive index of the pillar-shaped objects having a relatively high refractive index and the refractive index of the region having a relatively low refractive index is adjusted to a value of 0.01 or more.

The reason for this is that when such a difference in the refractive index is adjusted to a value of 0.01 or more, incident light can be reflected stably within the columnar structure, the incident angle dependency originating from the columnar structure can be further increased, and the distinction between the optical-diffusion incident angle region and the non-optical-diffusion incident angle region can be clearly controlled.

More specifically, it is because if such a difference in the refractive index has a value of below 0.01, the range of angle at which incident light is totally reflected within the columnar structure is narrowed, and therefore, the incident angle dependency may be decreased excessively.

Therefore, it is more preferable that the difference between the refractive index of the pillar-shaped objects having a relatively high refractive index and the refractive index of the region having a relatively low refractive index is adjusted to a value of 0.05 or more, and even more preferably to a value of 0.1 or more.

Incidentally, it is more preferable as the difference between the refractive index of the pillar-shaped objects having a relatively high refractive index and the refractive index of the region having a relatively low refractive index is larger; however, from the viewpoint of appropriately selecting a material capable of forming a bent columnar structure, a difference of about 0.3 may be considered as the upper limit.

(4)-2 Maximum Diameter

Figure 8A:
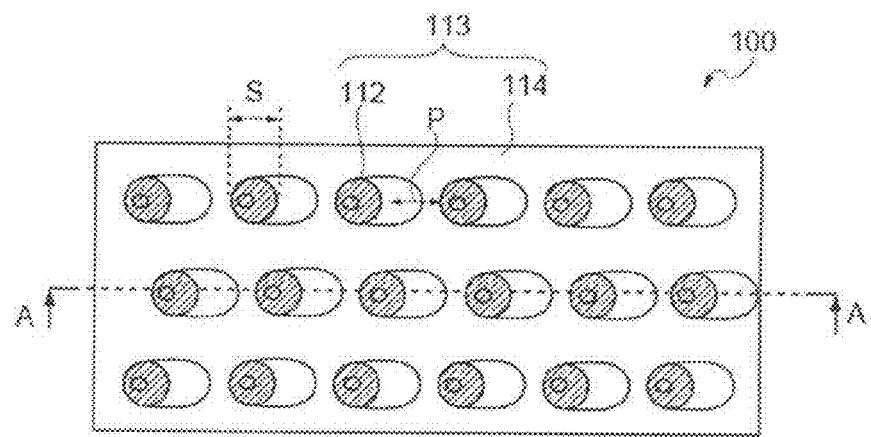
FIGS. 8(a) and 8(b) are diagrams provided to explain the columnar structure.

Also, as illustrated in FIG. 8(a), in regard to the columnar structure, it is preferable that the maximum diameter S in a cross-section of a pillar-shaped object is adjusted to a value within the range of 0.1 to 15 mm.

The reason for this is that when such a maximum diameter is adjusted to a value within the range of 0.1 to 15 µm, incident light can be reflected more stably within the columnar structure, and the incident angle dependency originating from the columnar structure can be enhanced more effectively.

That is, it is because if such a maximum diameter has a value of below 0.1 µm, it may be difficult to manifest light diffusibility, irrespective of the incident angle of incident light. On the other hand, it is because if such a maximum diameter has a value of above 15 µm, the amount of light that propagates straight within the columnar structure increases, and the uniformity of diffused light may be deteriorated.

Therefore, in regard to the columnar structure, it is more preferable that the maximum diameter in a cross-section of a pillar-shaped object is adjusted to a value within the range of 0.5 to 10 µm, and even more preferably to a value within the range of 1 to 5 µm.

Incidentally, the cross-sectional shape of the pillar-shaped objects is not particularly limited; however, it is preferable to have, for example, a circular shape, an elliptical shape, a polygonal shape, or an irregular shape for the cross-sectional shape.

Furthermore, the cross-section of a pillar-shaped object means a cross-section cut by a plane that is parallel to the film surface (meaning a surface other than a cross-section of the film; the same applies hereinafter).

Meanwhile, the maximum diameter, length and the like of a pillar-shaped object can be measured by observing the pillar-shaped object with an opto-digital microscope.

(4)-3 Distance Between Pillar-shaped Objects

Furthermore, as illustrated in FIG. 8(a), in regard to the columnar structure, it is preferable that the distance between pillar-shaped objects, that is, the space P between adjacent pillar-shaped objects, is adjusted to a value within the range of 0.1 to 15 µm.

The reason for this is that when such a distance is adjusted to a value within the range of 0.1 to 15 µm, incident light can be reflected more stably within the columnar structure, and the incident angle dependency originating from the columnar structure can be further enhanced.

That is, it is because if such a distance has a value of below 0.1 µm, it may be difficult to manifest light diffusibility irrespective of the incident angle of incident light. On the other hand, it is because if such a distance has a value of above 15 µm, the amount of light that propagates straight within the columnar structure increases, and the uniformity of diffused light may be deteriorated.

Therefore, in regard to the columnar structure, it is more preferable that the distance between the pillar-shaped objects is adjusted to a value within the range of 0.5 to 10 µm, and even more preferably to a value within the range of 1 to 5 µm.

(4)-4 Thickness

Figure 8B:
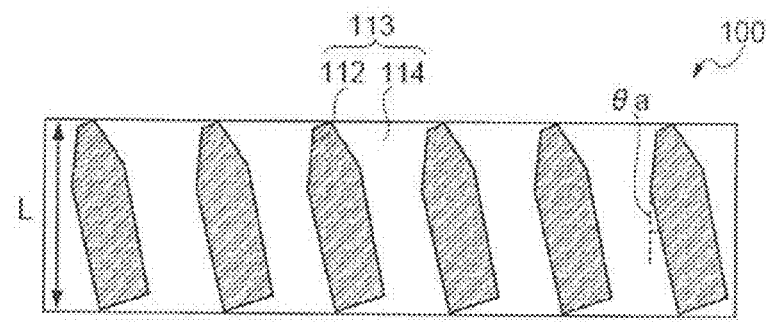

Furthermore, it is preferable that the thickness of the columnar structure, that is, the length L of the pillar-shaped objects in the normal line direction of the film plane as illustrated in FIG. 8(b), is adjusted to a value within the range of 50 to 700 µm.

The reason for this is that when the thickness of the columnar structure is adjusted to a value within such a range, the length of the pillar-shaped objects along the film thickness direction can be secured stably, incident light in the columnar structure can be reflected more stably, and the uniformity of the intensity of diffused light within the optical-diffusion angle region originating from the columnar structure can be further enhanced.

That is, it is because if the thickness L of such a columnar structure has a value of below 50 µm, the length of the pillar-shaped objects is insufficient, the amount of incident light that propagates straight within the columnar structure increases, and it may be difficult to obtain uniformity of the intensity of diffused light within the optical-diffusion angle region. On the other hand, it is because if the thickness L of such a columnar structure has a value of above 700 µm, when the columnar structure is formed by irradiating the composition for optical-diffusion film with active energy radiation, the direction of progress of photopolymerization is diffused by the initially formed columnar structure, and it may be difficult to form a desired columnar structure.

Therefore, it is more preferable that the thickness L of the columnar structure has a value within the range of 70 to 400 µm, and even more preferably to a value within the range of 80 to 300 µm.

Furthermore, the optical-diffusion film of the present invention may have a columnar structure (film thickness direction length L) formed over the entire film thickness direction as illustrated in FIG. 8(b), and may have a columnar structure-unformed portion on at least any one side of the upper end and the lower end of the film.

Meanwhile, in the case of the columnar structure having modified pillar-shaped objects as illustrated in FIGS. 7(a) and 7(b), it is preferable that the ratio of the length of the pillar-shaped objects in the upper portion (portion on the side where active energy radiation is irradiated when the optical-diffusion film is produced) and the length of the pillar-shaped objects in the lower portion is usually adjusted to a value within the range of 7:1 to 1:50.

(4)-5 Angle of Inclination

Furthermore, as illustrated in FIG. 8(b), it is preferable that in regard to the columnar structure, the pillar-shaped objects 112 are arranged to stand close together at a constant angle of inclination θa in the film thickness direction of the optical-diffusion film.

The reason for this is that by making the angle of inclination of the pillar-shaped objects constant, incident light can be reflected more stably within the columnar structure, and the incident angle dependency originating from the columnar structure can be further enhanced.

Furthermore, it is preferable that the angle of inclination θa is adjusted to a value within the range of 0° to 20°.

The reason for this is that since the display device of the present invention uses a collimated light having high parallelism, which orthogonally intersects with the display surface of the display panel, it is basically preferable that the angle of inclination is set to θa=0°; however, it is difficult in reality to regulate the angle of inclination θa perfectly to 0°. On the other hand, it is because if the angle of inclination θa has a value of above 20°, the front of the display device is shifted from the optical-diffusion angle region of the optical-diffusion film, and it may be difficult to satisfy the predetermined optical-diffusion characteristics defined by the haze value. Furthermore, it is because even if the optical-diffusion characteristics are satisfied, a significant bias may occur in the viewing angle in the vertical direction or in the horizontal direction of the display.

Therefore, it is more preferable that the angle of inclination θa is adjusted to a value within the range of 0° to 15°, and even more preferably to a value within the range of 0° to 10°.

Furthermore, the angle of inclination θa means the angle of inclination (°) of the pillar-shaped objects when the angle of the normal line with respect to the film surface, which is measured in a cross-section obtainable in a case in which the film is cut by a plane that is perpendicular to the film plane and cuts one whole pillar-shaped object into two along the axial line, is designated as 0°.

More specifically, as illustrated in FIG. 8(b), the angle of inclination θa means the narrower angle between the angles formed by the normal line of the upper end surface of the columnar structure and the top of the pillar-shaped objects.

Furthermore, as illustrated in FIG. 8(b), the angle of inclination obtainable when the pillar-shaped objects are inclined to the left side is taken as the reference, and the angle of inclination obtainable when the pillar-shaped objects are inclined to the right side is described with a minus sign.

Incidentally, in the case of the columnar structure having modified pillar-shaped objects illustrated in FIGS. 7(a) and 7(b), it is usually preferable that the angle of inclination of the pillar-shaped objects in the upper portion (pillar-shaped objects on the light entrance side) is adjusted to a value within the range of 0° to 20°, and also, the angle of incidence of the pillar-shaped objects in the lower portion (pillar-shaped objects on the light emission side) is adjusted to a value within the range of 0° to 20°.

(5) Film Thickness

Furthermore, the present invention is characterized in that the film thickness of the optical-diffusion film is adjusted to a value within the range of 60 to 700 μm.

The reason for this is that, if the film thickness of the optical-diffusion film has a value of below 60 μm, the amount of incident light that propagates straight within the columnar structure increases, and it may be difficult to exhibit predetermined optical-diffusion characteristics. On the other hand, it is because if the film thickness of the optical-diffusion film has a value of above 700 μm, when a columnar structure is formed by irradiating a composition for optical-diffusion film with active energy radiation, the direction of progress of photopolymerization is diffused by the initially formed columnar structure, and it may be difficult to form a desired columnar structure. Furthermore, it is because blurring may easily occur in the displayed image.

Therefore, it is more preferable that the film thickness of the optical-diffusion film is adjusted to a value within the range of 70 to 400 μm, and even more preferably to a value within the range of 80 to 300 μm.

(6) Tacky Adhesive Layer

Furthermore, it is preferable that the optical-diffusion film according to the present invention includes, on one surface or on both surfaces, a tacky adhesive layer for lamination to an adherend.

The tacky adhesive that constitutes such a tacky adhesive layer is not particularly limited, and any conventionally known acrylic, silicone-based, urethane-based, or rubber-based tacky adhesive can be used.

(7) Production Method

It is preferable that the optical-diffusion film according to the present invention is produced by a production method including the following steps (a) to (c):

(a) a step of preparing a composition for optical-diffusion film including a (meth)acrylic acid ester containing plural aromatic rings as component (A), a urethane(meth)acrylate as component (B), and a photopolymerization initiator as component (C);

(b) a step of applying the composition for optical-diffusion film on a process sheet, and forming a coating layer; and (c) a step of irradiating the coating layer with active energy radiation.

Hereinafter, the respective steps will be explained specifically with reference to the drawings.

(7)-1 Step (a)

This step is a step of preparing a predetermined composition for optical-diffusion film.

More specifically, the step is a step of mixing components (A) to (C) and other additives as desired.

Furthermore, on the occasion of mixing, the mixture may be stirred directly at room temperature; however, from the viewpoint of enhancing uniformity, for example, it is preferable to obtain a uniform mixed liquid by stirring the mixture under heating conditions of 40° C. to 80° C.

Furthermore, it is also preferable to further add a diluent solvent so as to obtain a desired viscosity appropriate for coating.

The composition for optical-diffusion film will be more specifically described below.

(i) Component (A)

(i)-1 Kind

It is preferable that the composition for optical-diffusion film according to the present invention includes a (meth)acrylic acid ester containing plural aromatic rings as component (A).

This is because it is speculated that when a particular (meth)acrylic acid ester is included as component (A), the polymerization rate of the component (A) can be made faster than the polymerization rate of the component (B), thereby a predetermined difference is generated between the polymerization rates of these components, and thus copolymerizability of the two components can be decreased effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed efficiently.

Furthermore, it is speculated that when a particular (meth)acrylic acid ester is included as the component (A), the component (A) has sufficient compatibility with the component (B) in the stage of existing as a monomer, while having the compatibility with the component (B) decreased to a predetermined range in the stage of existing as plural monomer molecules connected in the course of polymerization, and the columnar structure region can be formed more efficiently.

Furthermore, when the composition includes a particular (meth)acrylic acid ester as the component (A), the refractive index of the regions originating from the component (A) in the columnar structure region can be increased, and the difference between the refractive index of the regions originating from the component (A) and refractive index of the region originating from the component (B) can be regulated to a value more than or equal to a predetermined value.

Therefore, when the composition for optical-diffusion film includes a particular (meth)acrylic acid ester as the component (A), a columnar structure composed of plural pillar-shaped objects originating from the component (A) and having a relatively high refractive index and a region originating from the component (B) and having a relatively low refractive index can be obtained efficiently, together with the characteristics of the component (B) that will be described below.

Meanwhile, the "(meth)acrylic acid ester containing plural aromatic rings" means a compound having plural aromatic rings in the ester residue moiety of a (meth)acrylic acid ester.

Furthermore, "(meth)acrylic acid" means both acrylic acid and methacrylic acid.

Furthermore, examples of the (meth)acrylic acid ester containing plural aromatic rings as such a component (A) include biphenyl(meth)acrylate, naphthyl(meth)acrylate, anthracyl(meth)acrylate, benzylphenyl(meth)acrylate, a biphenyloxyalkyl(meth)acrylate, a naphthyloxyalkyl(meth) acrylate, an anthracyloxyalkyl(meth)acrylate, a benzylphenyloxyalkyl(meth)acrylate, and these compounds having some of hydrogen atoms on the aromatic rings substituted by a halogen, an alkyl, an alkoxy, a halogenated alkyl, or the like.

Furthermore, it is preferable that the composition for optical-diffusion film includes a compound containing a biphenyl ring as the (meth)acrylic acid ester containing plural aromatic rings as the component (A), and it is particularly preferable that the composition includes a biphenyl compound represented by the following formula (1):

[Chemical Formula 1]

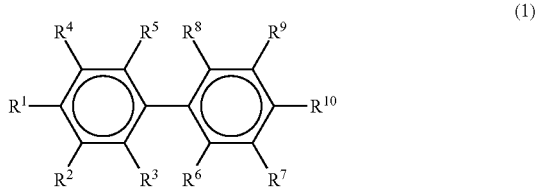

wherein in formula (1), $R^1$ to $R^{10}$ are respectively independent of one another; and at least one of $R^1$ to $R^{10}$ represents a substituent represented by the following formula (2), while the others each represent any one substituent selected from a hydrogen atom, a hydroxyl group, a carboxyl group, an alkyl group, an alkoxy group, a halogenated alkyl group excluding fluorine, a hydroxyalkyl group, a carboxyalkyl group, and a halogen atom other than fluorine;

[Chemical Formula 2]

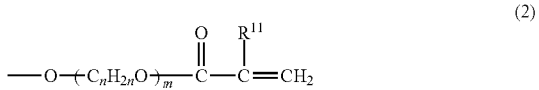

wherein in formula (2), $R^{11}$ represents a hydrogen atom or a methyl group; the number of carbon atoms n represents an integer from 1 to 4; and the number of repetition m represents an integer from 1 to 10.

This is because it is speculated that when the composition for optical-diffusion film includes a biphenyl compound having a particular structure as the component (A), a predetermined difference is generated between the polymerization rates of the component (A) and the component (B), thus the compatibility between the component (A) and the component (B) can be decreased to a predetermined range, and thereby the copolymerizability between the two components can be further decreased.

Furthermore, by increasing the refractive index of the regions originating from the component (A) in the columnar structure, the difference between the refractive index of the regions originating from the component (A) and the refractive index of the region originating from the component (B) can be regulated more easily to a value higher than or equal to a predetermined value.

Furthermore, when $R^1$ to $R^{10}$ in formula (1) includes any one of an alkyl group, an alkoxy group, a halogenated alkyl group, a hydroxyalkyl group and a carboxyalkyl group, it is preferable that the number of carbon atoms of the alkyl moiety is adjusted to a value within the range of 1 to 4.

The reason for this is that if such a number of carbon atoms has a value of above 4, the polymerization rate of the component (A) may be decreased, or the refractive index of the regions originating from the component (A) may become too low, and it may be difficult to form a columnar structure efficiently.

Therefore, when $R^1$ to $R^{10}$ in formula (1) includes any one of an alkyl group, an alkoxy group, a halogenated alkyl group, a hydroxyalkyl group and a carboxyalkyl group, it is more preferable to adjust the number of carbon atoms of the alkyl moiety to a value within the range of 1 to 3, and even more preferably to a value within the range of 1 to 2.

Furthermore, it is preferable that $R^1$ to $R^{10}$ in formula (1) each represent a substituent other than a halogenated alkyl group or a halogen atom, that is, a substituent that does not contain halogen.

The reason for this is that generation of dioxin occurring when an optical-diffusion film is incinerated is prevented, and this is preferable from the viewpoint of environmental protection.

Incidentally, in regard to the conventional optical-diffusion film, on the occasion of obtaining a predetermined columnar structure, it has been common to perform halogen substitution on monomer components for the purpose of increasing the refractive indices of the monomer components.

In this regard, when a biphenyl compound represented by formula (1) is used, a high refractive index may be obtained even if halogen substitution is not applied.

Therefore, when an optical-diffusion film formed by photocuring the composition for optical-diffusion film according to the present invention is employed, satisfactory incident angle dependency can be manifested, even in a case in which the optical-diffusion film does not contain halogen.

Furthermore, it is preferable that any one of $R^2$ to $R^9$ in formula (1) represents the substituent represented by formula (2).

The reason for this is that when the position of the substituent represented by formula (2) is set to a position other than $R^1$ or $R^{10}$, the molecules of the component (A) can be effectively prevented from being oriented and crystallized in a stage before photocuring.

Furthermore, the compound is liquid in the stage of existing as a monomer before photocuring, and even though a diluent solvent of the like is not used, the component (A) can be apparently uniformly mixed with the component (B).

Thereby, in the stage of photocuring, aggregation and phase separation of the component (A) and the component (B) at a fine level is enabled, and therefore, an optical-diffusion film having a columnar structure can be obtained more efficiently.

Furthermore, from the same point of view, it is particularly preferable that any one of $R^3$, $R^5$, $R^6$ and $R^8$ in formula (1) represents a substituent represented by formula (2)

Also, it is preferable that the number of repetitions m for the substituent represented by formula (2) is usually adjusted to an integer of 1 to 10.

The reason for this is that if the number of repetitions m has a value of above 10, the oxyalkylene chain that links the site of polymerization and the biphenyl ring becomes too long, and polymerization between the molecules of the component (A) at the site of polymerization may be inhibited.

Therefore, it is more preferable that the number of repetitions m for the substituent represented by formula (2) is adjusted to an integer of 1 to 4, and particularly preferably to an integer of 1 or 2.

Meanwhile, from the same point of view, it is preferable that the number of carbon atoms n for the substituent represented by formula (2) is usually adjusted to an integer of 1 to 4.

Also, when even the case is considered in which the position of a polymerizable carbon-carbon double bond, which is a site of polymerization, is too close to the biphenyl ring so that the biphenyl ring behaves as a steric hindrance, and the polymerization rate of the component (A) is decreased, it is more preferable that the number of carbon atoms n for the substituent represented by formula (2) is adjusted to an integer of 2 to 4, and particularly preferably to an integer of 2 or 3.

Furthermore, specific preferred examples of the biphenyl compound represented by formula (1) include compounds represented by the following formulas (3) and (4):

[Chemical Formula 3]

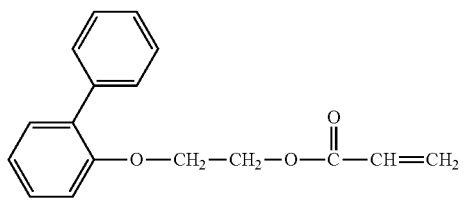

(3)

[Chemical Formula 4]

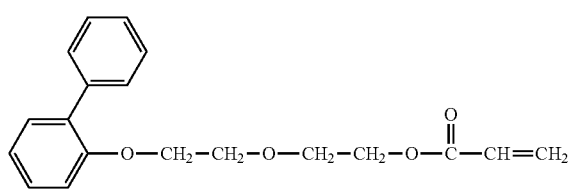

(4)

(i)-2 Molecular Weight

Furthermore, it is preferable that the molecular weight of the component (A) is adjusted to a value within the range of 200 to 2,500.

This is because it is speculated that when the molecular weight of the component (A) is adjusted to a predetermined range, the polymerization rate of the component (A) can be made much faster, and copolymerizability of the component (A) and the component (B) can be decreased more effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed more efficiently.

That is, it is because it is speculated that if the molecular weight of the component (A) has a value of below 200, steric hindrance is diminished, copolymerization between the component (A) and the component (B) may easily occur, and as a result, it may be difficult to form the columnar structure efficiently. On the other hand, it is because it is speculated that if the molecular weight of the component (A) has a value of above 2,500, as the difference between the molecular weight of the component (A) and the molecular weight of the component (B) becomes smaller, the polymerization rate of the component (A) decreases and approaches the polymerization rate of the component (B), thus copolymerization of the component (A) and the component (B) may easily occur, and as a result, it may be difficult to form the columnar structure efficiently.

Therefore, it is more preferable that the molecular weight of the component (A) is adjusted to a value within the range of 240 to 1,500, and even more preferably to a value within the range of 260 to 1,000.

Meanwhile, the molecular weight of the component (A) can be determined from a calculated value obtainable from the molecular composition and the atomic weights of the constituent atoms.

(i)-3 Single Use

Furthermore, the composition for optical-diffusion film according to the present invention includes the component (A) as a monomer component that forms the regions having a relatively high refractive index in the columnar structure; however, it is preferable that the component (A) is composed of a single component.

The reason for this is that, when such a configuration is adopted, fluctuation in the refractive index in the regions originating from the component (A) is effectively suppressed, and thereby an optical-diffusion film having a columnar structure can be obtained more efficiently.

That is, when the compatibility of the component (A) for the component (B) is low, for example, when the component (A) is a halogen-based compound or the like, there is a case in which another component (A) (for example, a non-halogen-based compound or the like) is used in combination as a third component for compatibilizing the component (A) with the component (B).

However, in this case, the refractive index in the regions originating from the component (A) and having a relatively high refractive index may fluctuate or may be easily decreased due to the influence of such a third component.

As a result, the difference between the refractive index of the regions originating from the component (A) and the refractive index of the region originating from the component (B) and having a relatively low refractive index may become non-uniform or may be excessively easily decreased.

Therefore, it is preferable to select a high refractive index monomer component having compatibility with the component (B), and use that monomer component as a single component (A).

Incidentally, for example, if a biphenyl compound represented by formula (3) is used as the component (A), since this compound has low viscosity, the biphenyl compound has compatibility with the component (B) and can therefore be used as a single component (A).

(i)-4 Refractive Index

Furthermore, it is preferable that the refractive index of the component (A) is adjusted to a value within the range of 1.5 to 1.65.

The reason for this is that when the refractive index of the component (A) is adjusted to a value within such a range, the difference between the refractive index of the regions originating from the component (A) and the refractive index of the region originating from the component (B) can be regulated more easily, and an optical-diffusion film having a columnar structure can be obtained more efficiently.

That is, it is because if the refractive index of the component (A) has a value of below 1.5, the difference between the refractive index of the component (A) and the refractive index of the component (B) becomes too small, and it may be difficult to obtain an effective optical-diffusion angle region. On the other hand, it is because if the refractive index of the component (A) has a value of above 1.65, the difference between the refractive index of the component (A) and the refractive index of the component (B) becomes larger; however, it may be difficult to form even an apparently compatible state between the component (A) and the component (B).

Therefore, it is more preferable that the refractive index of the component (A) is adjusted to a value within the range of 1.52 to 1.62, and even more preferably to a value within the range of 1.56 to 1.6.

Incidentally, the refractive index of the component (A) mentioned above means the refractive index of the component (A) before being cured by light irradiation.

Furthermore, the refractive index can be measured according to, for example, JIS K0062.

(i)-5 Content

Furthermore, it is preferable that the content of the component (A) in the composition for optical-diffusion film is adjusted to a value within the range of 25 parts to 400 parts by weight relative to 100 parts by weight of the component (B) that will be described below.

The reason for this is that if the content of the component (A) has a value of below 25 parts by weight, the existence ratio of the component (A) to the component (B) becomes small, the width of the pillar-shaped objects originating from the component (A) in the columnar structure illustrated in the cross-sectional view of FIG. 3(b) becomes excessively small, and it may be difficult to obtain a columnar structure having satisfactory incident angle dependency. Furthermore, it is because the length of the pillar-shaped objects in the thickness direction of the optical-diffusion film becomes insufficient, and predetermined optical-diffusion characteristics may not be exhibited. On the other hand, it is because if the content of the component (A) has a value of above 400 parts by weight, the existence ratio of the component (A) to the component (B) becomes high, the width of the pillar-shaped objects originating from the component (A) becomes excessively large, and in contrast, it may be difficult to obtain a columnar structure having satisfactory incident angle dependency. Furthermore, it is because the length of the pillar-shaped objects in the thickness direction of the optical-diffusion film becomes insufficient, and predetermined optical-diffusion characteristics may not be exhibited.

Therefore, it is more preferable that the content of the component (A) is adjusted to a value within the range of 40 parts to 300 parts by weight, and even more preferably to a value within the range of 50 parts to 200 parts by weight, relative to 100 parts by weight of the component (B).

(ii) Component (B)

(ii)-1 Kind

It is preferable that the composition for optical-diffusion film according to the present invention includes a urethane (meth)acrylate as the component (B).

The reason for this is that when a urethane(meth)acrylate is used, not only the difference between the refractive index of the region originating from the component (A) and the refractive index of the region originating from the component (B) can be regulated more easily, but also fluctuation in the refractive index of the region originating from the component (B) can be suppressed effectively, and an optical-diffusion having a columnar structure can be obtained more efficiently.

Meanwhile, the term (meth)acrylate means both acrylate and methacrylate.

First, a urethane(meth)acrylate is formed from (B1) a compound containing at least two isocyanate groups, (B2) a polyol compound, preferably a diol compound, and particularly preferably a polyalkylene glycol, and (B3) a hydroxyalkyl(meth)acrylate.

Incidentally, the component (B) also includes oligomers having repeating units with urethane bonds.

Among these, examples of the compound containing at least two isocyanate groups as the component (B1) include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; and biuret forms and isocyanurate forms thereof, and adduct forms (for example, a xylylene diisocyanate-based trifunctional adduct), which are reaction products between these compounds and low molecular weight hydrogen-containing compounds such as ethylene glycol, propylene glycol, neopentyl glycol, trimethylolpropane, and castor oil.

Furthermore, among those mentioned above, the compound is particularly preferably an alicyclic polyisocyanate.

The reason for this is that when an alicyclic polyisocyanate is used, it is easier to produce a difference in the rate of reaction between various isocyanate groups in relation to conformation or the like, compared to aliphatic polyisocyanates.

Thereby, the situation in which the component (B1) reacts only with the component (B2), or the component (B1) reacts only with the component (B3), can be suppressed, thereby the component (B1) can be made to reliably react with the component (B2) and the component (B3), and the generation of excessive side products can be prevented.

As a result, fluctuation in the refractive index of the region originating from the component (B), that is, the low refractive index region, in the columnar structure can be effectively suppressed.

Furthermore, when an alicyclic polyisocyanate is used, the compatibility between the resulting component (B) and the component (A) can be decreased to a predetermined range, and the columnar structure can be formed more efficiently, compared to aromatic polyisocyanates.

Furthermore, when an alicyclic polyisocyanate is used, the refractive index of the resulting component (B) can be made smaller compared to aromatic polyisocyanates. Therefore, the difference between the refractive index of the component (B) and the refractive index of the component (A) can be made large, light diffusibility can be exhibited more reliably, and also, a columnar structure having high uniformity of diffused light within the optical-diffusion angle region can be formed even more efficiently.

Also, among such alicyclic polyisocyanates, a compound containing two isocyanate groups via an aliphatic ring is preferred.

The reason for this is that when such an alicyclic diisocyanate is used, the compound reacts quantitatively with the component (B2) and the component (B3), and a single component (B) can be obtained.

Regarding such an alicyclic diisocyanate, isophorone diisocyanate (IPDI) is particularly preferably used.

The reason for this is that an effective difference can be provided in the reactivity of the two isocyanate groups.

Furthermore, among the components that form the urethane(meth)acrylate, examples of the polyalkylene glycol as the component (B2) include polyethylene glycol, polypropylene glycol, polybutylene glycol, and polyhexylene glycol, and among them, the polyalkylene glycol is particularly preferably polypropylene glycol.

The reason for this is that, with polypropylene glycol, when the component (B) is cured, polypropylene glycol becomes a satisfactory soft segment in the cured product, and can effectively enhance handleability or mountability of the optical-diffusion film.

Incidentally, the weight average molecular weight of the component (B) can be regulated mainly by the weight average molecular weight of the component (B2). Here, the weight average molecular weight of the component (B2) is usually 2,300 to 19,500, preferably 4,300 to 14,300, and particularly preferably 6,300 to 12,300.

Furthermore, among the components that form the urethane(meth)acrylate, examples of the hydroxyalkyl(meth)acrylate as the component (B3) include 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, and 4-hydroxybutyl(meth)acrylate.

Furthermore, from the viewpoint of decreasing the polymerization rate of the urethane(meth)acrylate thus obtainable and forming the columnar structure more efficiently, the component (B2) is more preferably a hydroxyalkyl methacrylate, in particular, and even more preferably 2-hydroxyethyl methacrylate.

Furthermore, synthesis of the urethane(meth)acrylate using the components (B1) to (B3) can be carried out by a conventional method.

At this time, it is preferable to adjust the mixing ratio of the components (B1) to (B3) to a ratio of component (B1):component (B2):component (B3)=1 to 5:1:1 to 5 as a molar ratio.

The reason for this is that when such a mixing ratio is employed, a urethane(meth)acrylate in which two hydroxyl groups carried by a molecule of the component (B2) respectively react with one of the isocyanate groups carried by a molecule of the component (B1) to form bonding therebetween, and the other isocyanate groups carried by the two molecules of the component (B1) respectively react with a hydroxyl group carried by a molecule of the component (B3) to form bonding therebetween, can be synthesized efficiently.

Therefore, it is more preferable to adjust the mixing ratio of the components (B1) to (B3) to a ratio of component (B1):component (B2):component (B3)=1 to 3:1:1 to 3, and even more preferably to a ratio of 2:1:2, as a molar ratio.

(ii)-2 Weight Average Molecular Weight

Furthermore, it is preferable that the weight average molecular weight of the component (B) is adjusted to a value within the range of 3,000 to 20,000.

This is because it is speculated that when the weight average molecular weight of the component (B) is adjusted to a predetermined range, a predetermined difference is produced in the polymerization rates of the component (A) and the component (B), and copolymerizability of the two components can be decreased effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed efficiently.

That is, it is because if the weight average molecular weight of the component (B) has a value of below 3,000, the polymerization rate of the component (B) becomes faster and approaches the polymerization rate of the component (A), copolymerization of the component (B) and the component (A) easily occurs, and as a result, it may be difficult to form the columnar structure efficiently. On the other hand, it is because if the weight average molecular weight of the component (B) has a value of above 20,000, it may be difficult to form a columnar structure, or compatibility between the component (B) and the component (A) decreases excessively, and the component (A) may be precipitated out in the coating stage.

Therefore, it is more preferable that the weight average molecular weight of the component (B) is adjusted to a value within the range of 5,000 to 15,000, and even more preferably to a value within the range of 7,000 to 13,000.

Meanwhile, the weight average molecular weight of the component (B) can be measured using gel permeation chromatography (GPC).

(ii)-3 Single Use

Furthermore, regarding the component (B), two or more kinds having different molecular structures or different weight average molecular weights may be used in combination; however, from the viewpoint of suppressing fluctuation in the refractive index of the region originating from the component (B) in the columnar structure, it is preferable to use only one kind.

That is, it is because when plural kinds of the component (B) are used, the refractive index in the region originating from the component (B) and having a relatively low refractive index may fluctuate or increase, and the difference between the refractive index of the region originating from the component (B) and having a relatively high refractive index and the refractive index of the regions originating from the component (A) and having a relatively high refractive index may become non-uniform or may be decreased excessively.

(ii)-4 Refractive Index

Furthermore, it is preferable that the refractive index of the component (B) is adjusted to a value within the range of 1.4 to 1.55.

The reason for this is that when the refractive index of the component (B) is adjusted to a value within such a range, the difference between the refractive index of the regions originating from the component (A) and the refractive index of the region originating from the component (B) can be regulated more easily, and an optical-diffusion film having a columnar structure can be obtained more efficiently.

That is, it is because if the refractive index of the component (B) has a value of below 1.4, the difference between the refractive index of the component (B) and the refractive index of the component (A) becomes large; however, there is a risk that the compatibility of the component (B) with the component (A) may become extremely poor, and a columnar structure may not be formed. On the other hand, it is because if the refractive index of the component (B) has a value of above 1.55, the difference between the refractive index of the component (B) and the refractive index of the component (A) becomes too small, and it may be difficult to obtain desired incident angle dependency.

Therefore, it is more preferable that the refractive index of the component (B) is adjusted to a value within the range of 1.45 to 1.54, and even more preferably to a value within the range of 1.46 to 1.52.

Meanwhile, the refractive index of the component (B) described above means the refractive index of the component (B) before being cured by light irradiation.

The refractive index can be measured according to, for example, JIS K0062.

Furthermore, it is preferable that the difference between the refractive index of the component (A) and the refractive index of the component (B) described above is adjusted to a value of 0.01 or more.

The reason for this is that when such a difference in the refractive index is adjusted to a value within a predetermined range, an optical-diffusion film having more satisfactory incident angle dependency in transmission and diffusion of light, and a broader optical-diffusion incident angle region can be obtained.

That is, it is because if such a difference in the refractive index has a value of below 0.01, the angle range in which incident light undergoes total reflection within the columnar structure is narrowed, and therefore, the angle of aperture for optical-diffusion may become excessively narrow. On the other hand, it is because if such a difference in the refractive index has an excessively large value, there is a risk that the compatibility between the component (A) and the component (B) may become so poor that a columnar structure may not be formed.

Therefore, it is more preferable that the difference between the refractive index of the component (A) and the refractive index of the component (B) is adjusted to a value within the range of 0.05 to 0.5, and even more preferably to a value within the range of 0.1 to 0.2.

Incidentally, the refractive indices of the component (A) and the component (B) as used herein means the refractive indices of the component (A) and the component (B) before being cured by light irradiation.

(ii)-5 Content

Furthermore, it is preferable that the content of the component (B) in the composition for optical-diffusion film is adjusted to a value within the range of 10 parts to 75 parts by weight relative to 100 parts by weight of the total amount of the composition for optical-diffusion film.

The reason for this is that if the content of the component (B) has a value of below 10 parts by weight, the existence ratio of the component (B) to the component (A) becomes small, the region originating from the component (B) becomes excessively small compared to the regions originating from the component (A), and it may be difficult to obtain a columnar structure having satisfactory incident angle dependency. On the other hand, it is because if the content of the component (B) has a value of above 75 parts by weight, the existence ratio of the component (B) to the component (A) becomes high, the region originating from the component (B) becomes excessively large compared to the regions originating from the component (A), and in contrast, it may be difficult to obtain a columnar structure having satisfactory incident angle dependency.

Therefore, it is more preferable that the content of the component (B) is adjusted to a value within the range of 20 parts to 70 parts by weight, and even more preferably to a value within the range of 30 parts to 60 parts by weight, relative to 100 parts by weight of the total amount of the composition for optical-diffusion film.

(iii) Component (C)

(iii)-1 Kind

It is preferable that the composition for optical-diffusion film according to the present invention includes a photopolymerization initiator as a component (C).

The reason for this is that when the composition for optical-diffusion film is irradiated with active energy radiation, a columnar structure in which plural pillar-shaped objects originating from the component (A) and having a relatively high refractive index are arranged to stand close together in a region originating from the component (B) and having a relatively low refractive index, can be formed efficiently.

Here, a photopolymerization initiator refers to a compound which generates a radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl-2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiary butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic acid ester, and oligo[2-hydroxy-2-methyl-1-[4-(1-methylvinyl)phenyl]propane]. Among these, one kind thereof may be used alone, or two or more kinds thereof may be used in combination.

(iii)-2 Content

Furthermore, it is preferable that the content of the component (C) in the composition for optical-diffusion film is adjusted to a value within the range of 0.2 parts to 20 parts by weight relative to the total amount (100 parts by weight) of the component (A) and the component (B).

The reason for this is that if the content of the component (C) has a value of below 0.2 parts by weight, it may be difficult to obtain an optical-diffusion film having sufficient incident angle dependency, and also, the number of polymerization initiation points may be excessively small so that it may be difficult to photocure the film sufficiently. On the other hand, it is because if the content of the component (C) has a value of above 20 parts by weight, excessively strong ultraviolet absorption may occur at the surface layer of the coating layer, photocuring of the film may be rather inhibited, an excessively strong foul odor may be generated, or the initial yellow tinge in the film may be intensified.

Therefore, it is more preferable that the content of the component (C) is adjusted to a value within the range of 0.5 parts to 15 parts by weight, and even more preferably to a value within the range of 1 part to 10 parts by weight, relative to the total amount (100 parts by weight) of the component (A) and the component (B).

(iv) Component (D)

(iv)-1 Kind

It is also preferable that, particularly in a case in which a columnar structure having modified pillar-shaped objects 112' having a bent part in the middle of the pillar-shaped objects as illustrated in FIG. 7(*a*) is formed, the composition for optical-diffusion film according to the present invention includes an ultraviolet absorber as a component (D).

The reason for this is that when the composition for optical-diffusion film includes an ultraviolet absorber as a component (D), when the composition is irradiated with active energy radiation, an active energy radiation having a predetermined wavelength can be selectively absorbed to a predetermined extent.

As a result, a bend may be produced in the columnar structure formed in the film as illustrated in FIG. 7(*a*), without inhibiting the curing of the composition for optical-diffusion film, and thereby predetermined optical-diffusion characteristics can be imparted more stably to the resulting optical-diffusion film.

Furthermore, it is preferable that the component (D) is at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber.

Specific preferred examples of the hydroxyphenyltriazine-based ultraviolet absorber include compounds represented by the following formulas (5) to (9):

[Chemical Formula 5]

(5)

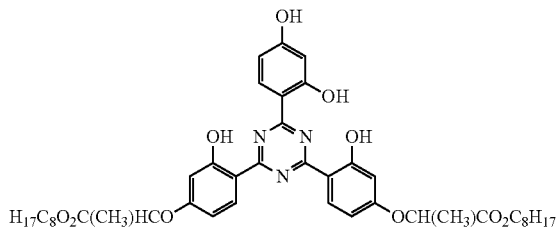

[Chemical Formula 6]

(6)

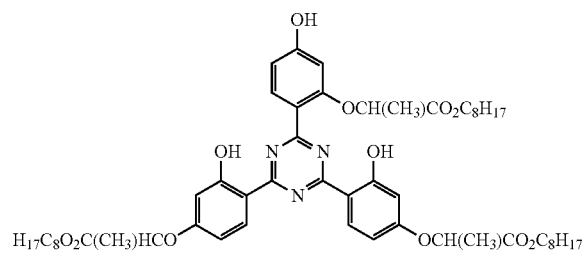

[Chemical Formula 7]

(7)

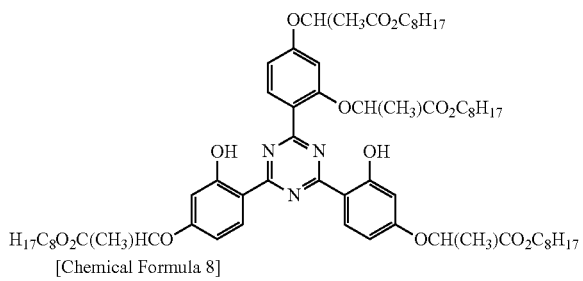

[Chemical Formula 8]

(8)

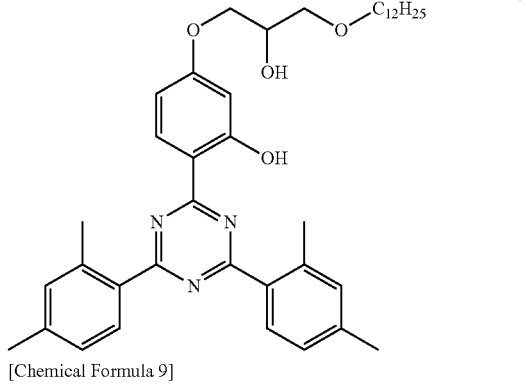

[Chemical Formula 9]

(9)

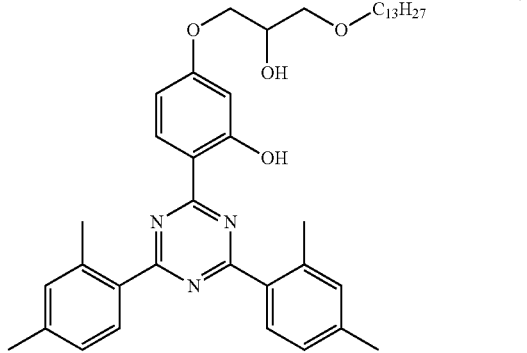

Furthermore, specific preferred examples of the benzotriazole-based ultraviolet absorber include compounds represented by the following formula (10):

[Chemical Formula 10]

(10)

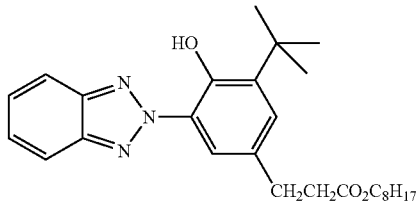

(iv)-2 Content

Furthermore, in a case in which the composition for optical-diffusion film includes the component (D), it is preferable that the content of the component (D) in the composition for optical-diffusion film is adjusted to a value of below 2 parts by weight (provided that excluding 0 parts by weight) relative to the total amount (100 parts by weight) of the component (A) and the component (B).

The reason for this is that when the content of the component (D) is adjusted to a value within such a range, a bend can be produced in the column structure formed in the film, without inhibiting the curing of the composition for optical-diffusion film, and thereby predetermined optical-diffusion characteristics can be imparted more stably to the resulting optical-diffusion film.

That is, it is because if the content of the component (D) has a value of 2 parts by weight or more, curing of the composition for optical-diffusion film may be inhibited, shrinkage wrinkles may be generated on the film surface, or curing may not occur at all. On the other hand, it is because if the content of the component (D) is made excessively small, it may be difficult to cause sufficient bending in the predetermined internal structure formed in the film, and it may be difficult to impart predetermined optical-diffusion characteristics stably to the resulting optical-diffusion film.

Therefore, it is more preferable that the content of the component (D) is adjusted to a value within the range of 0.01 parts to 1.5 parts by weight, and even more preferably to a value within the range of 0.02 parts to 1 part by weight, relative to the total amount (100 parts by weight) of the component (A) and the component (B).

(v) Other Additives

Furthermore, additives other than the compounds mentioned above can be appropriately added to the extent that the effects of the present invention are not impaired.

Examples of such additives include a hindered amine-based photostabilizer, an oxidation inhibitor, an antistatic agent, a polymerization accelerator, a polymerization inhibitor, an infrared absorber, a plasticizer, a diluent solvent, and a leveling agent.

It is generally preferable that the content of such additives is adjusted to a value within the range of 0.01% to 5% by weight, more preferably to a value of 0.02% to 3% by weight, and even more preferably to a value within the range of 0.05% to 2% by weight, relative to the total amount (100% by weight) of the component (A) and the component (B).

(7)-2 Step (b): Application Step

Such a step is a step of applying the composition for optical-diffusion film on a process sheet 102 and forming a coating layer 101, as illustrated in FIG. 9(a).

Regarding the process sheet, a plastic film and paper can both be used.

Among these, examples of the plastic film include polyester-based films such as a polyethylene terephthalate film; polyolefin-based films such as a polyethylene film and a polypropylene film; cellulose-based films such as a triacetyl cellulose film; and polyimide-based films.

Examples of the paper include glassine paper, coated paper, and laminated paper.

Furthermore, when the processes that will be described below are considered, the process sheet 102 is preferably a plastic film having excellent dimensional stability against heat or active energy radiation.

Preferred examples of such a plastic film include, among those described above, a polyester-based film, a polyolefin-based film, and a polyimide-based film.

Furthermore, in regard to the process sheet, it is preferable that in order to make it easier to detach the optical-diffusion film obtained after photocuring from the process sheet, it is preferable to provide a peeling layer on the side of the surface of the process sheet where the composition for optical-diffusion film has been applied.

Such a peeling layer can be formed using a conventionally known peeling agent such as a silicone-based peeling agent, a fluorine-based peeling agent, an alkyd-based peeling agent, or an olefin-based peeling agent.

Meanwhile, it is preferable that the thickness of the process sheet is usually adjusted to a value within the range of 25 to 200 µm.

Furthermore, regarding the method for applying the composition for optical-diffusion film on the process sheet, for example, the method can be carried out by any conventionally known method such as a knife coating method, a roll coating method, a bar coating method, a blade coating method, a die coating method, or a gravure coating method.

Incidentally, at this time, it is preferable to adjust the film thickness of the coating layer to a value within the range of 60 to 700 µm.

(7)-3 Step (c): Active Energy Ray Irradiation Step

Such a step is a step of subjecting the coating layer 101 to active energy ray irradiation, forming a columnar structure within the film, and obtaining an optical-diffusion film, as illustrated in FIG. 9(b).

More specifically, in the active energy ray irradiation step, the coating layer formed on the process sheet is irradiated with parallel light having high parallelism of light rays.

Here, parallel light means an approximately parallel light in which the direction of emitted light does not spread even if viewed from any direction.

Figure 10A:
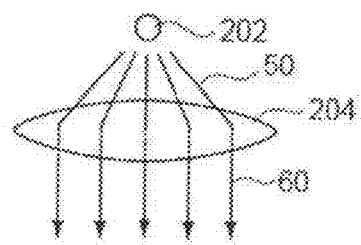
FIGS. 10(a) to 10(d) are diagrams provided to explain an active energy ray irradiation step.
Figure 10B:
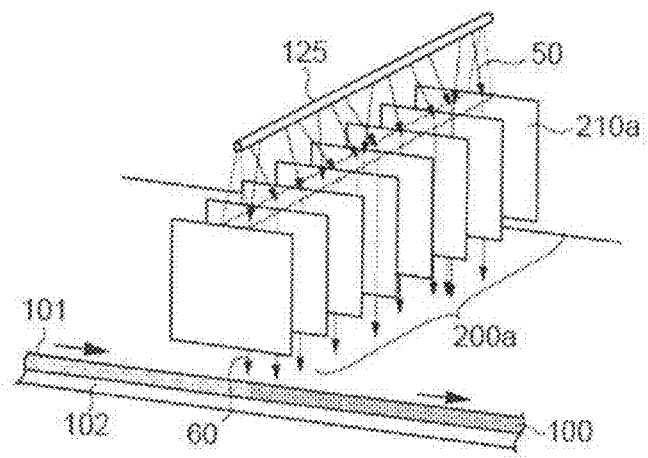
Figure 10C:
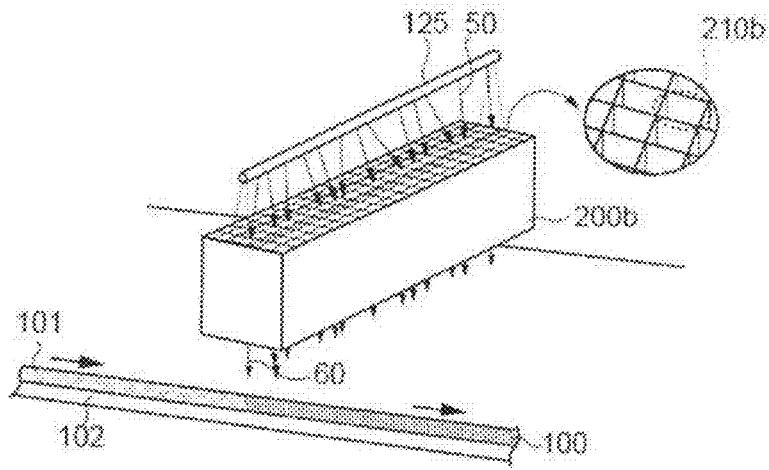

More specifically, for example, as illustrated in FIG. 10(a), it is preferable that irradiated light 50 coming from a point light source 202 is converted to parallel light 60 by means of a lens 204, and then the parallel light is irradiated to the coating layer 101, or as illustrated in FIGS. 10(b) and 10(c), irradiated light 50 coming from a linear light source 125 is converted to parallel light 60 by means of irradiated light parallelizing members 200 (200a, 200b), and then the parallel light is irradiated to the coating layer 101.

Figure 10D:
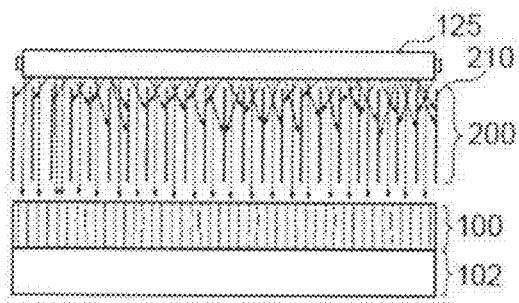

Meanwhile, as illustrated in FIG. 10(d), the irradiated light parallelizing members 200 can convert, among the direct light emitted by the linear light source 125, a direct light emitted by a linear light source 125 to parallel light, by unifying the direction of light using, for example, light blocking members 210 such as plate-shaped members 210a or cylindrical members 210b in a direction parallel to the axial line direction of the linear light source 125 whose direction of light is random.

More specifically, among the direct light emitted by a linear light source 125, a light having low parallelism with respect to light blocking members 210 such as plate-shaped members 210a or cylindrical members 210b is brought into contact with these light blocking members and is absorbed.

Therefore, a light having high parallelism with respect to the light blocking members 210 such as plate-shaped members 210a or cylindrical members 210b, that is, only parallel light passes through irradiated light parallelizing members 200, and as a result, direct light emitted by the linear light source 125 is converted to parallel light by the irradiated light parallelizing members 200.

Meanwhile, the material for the light blocking members 210 such as plate-shaped members 210a or cylindrical members 210b is not particularly limited as long as the material can absorb a light having low parallelism with respect to the light blocking members 210, and for example, a heat-resistant black-painted Ulster steel sheet can be used.

Furthermore, it is preferable that the parallelism of irradiated light is adjusted to a value of 100 or less.

The reason for this is that when the parallelism of irradiated light is adjusted to a value within such a range, the columnar structure can be formed efficiently and stably.

Therefore, it is more preferable that the parallelism of irradiated light to a value of 5° or less, and even more preferably to a value of 2° or less.

Figure 11:
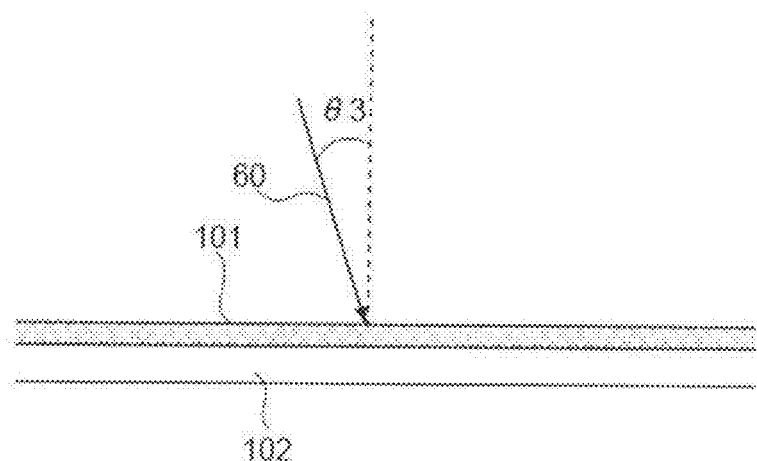
FIG. 11 is another diagram provided to explain the active energy ray irradiation step.

Furthermore, regarding the angle of irradiation of irradiated light, it is preferable that as illustrated in FIG. 11, the angle of irradiation θ3 obtainable in the case in which the angle of the normal line with respect to the surface of the coating layer 101 is designated as 0° is usually adjusted to a value within the range of −80° to 80°.

The reason for this is that when the angle of irradiation has a value outside the range of −80° to 80°, the influence of reflection at the surface of the coating layer 101 or the like increases, and it may be difficult to form a sufficient columnar structure.

Furthermore, examples of the irradiated light include ultraviolet radiation and an electron beam, and it is preferable to use ultraviolet radiation.

The reason for this is that, in the case of an electron beam, since the polymerization rate is very fast, the component (A) and the component (B) may not undergo phase separation sufficiently in the course of polymerization, and it may be difficult to form a columnar structure. On the other hand, when compared with visible light or the like, it is because ultraviolet radiation is associated with a wide variety of ultraviolet-curable resins that are cured by irradiation of ultraviolet radiation, or a wide variety of photopolymerization initiators that can be used, and therefore, the widths of selection of the component (A) and the component (B) can be broadened.

Furthermore, regarding the conditions for irradiation of ultraviolet radiation, it is preferable that the peak illuminance at the coating layer surface is adjusted to a value within the range of 0.1 to 10 mW/cm$^2$.

The reason for this is that, if such a peak illuminance has a value of below 0.1 mW/cm$^2$, it may be difficult to form the columnar structure in a well-defined manner. On the other hand, it is because if such a peak illuminance has a value of above 10 mW/cm$^2$, curing occurs before phase separation of the component (A) and the component (B) proceeds, and in contrast, it may be difficult to form the columnar structure in a well-defined manner.

Therefore, it is more preferable that the peak illuminance at the coating layer surface upon ultraviolet ray irradiation is adjusted to a value within the range of 0.3 to 8 mW/cm$^2$, and even more preferably to a value within the range of 0.5 to 6 mW/cm$^2$.

It is preferable that the cumulative amount of light at the coating layer surface upon ultraviolet ray irradiation is adjusted to a value within the range of 5 to 200 mJ/cm$^2$.

The reason for this is that if such a cumulative amount of light has a value of below 5 mJ/cm$^2$, it may be difficult to extend the columnar structure sufficiently from the upper part toward the lower part. On the other hand, it is because if such a cumulative amount of light has a value of above 200 mJ/cm$^2$, coloration may occur in the resulting optical-diffusion film.

Therefore, it is more preferable that the cumulative amount of light at the coating layer surface upon ultraviolet ray irradiation is adjusted to a value within the range of 7 to 150 mJ/cm$^2$, and even more preferably to a value within the range of 10 to 100 mJ/cm$^2$.

Meanwhile, it is preferable to optimize the peak illuminance and the cumulative amount of light by means of the internal structure formed in the film.

Furthermore, it is preferable that at the time of ultraviolet ray irradiation, the coating layer formed on the process sheet is moved at a speed of 0.1 to 10 m/min.

The reason for this is that if such a speed has a value of below 0.1 m/min, mass productivity may be excessively decreased. On the other hand, if such a speed has a value of above 10 m/min, the travel speed may be faster than the speed of curing of the coating layer, in other words, the speed of formation of the columnar structure, the incident angle of ultraviolet radiation with respect to the coating layer may change, and the formation of the columnar structure region may be achieved insufficiently.

Therefore, it is more preferable that, at the time of ultraviolet ray irradiation, the coating layer formed on the process sheet is moved at a speed within the range of 0.2 to 5 m/min, and is even more preferably moved at a speed within the range of 0.3 to 3 m/min.

Incidentally, the optical-diffusion film after the ultraviolet ray irradiation step is finally brought into a state of being usable, by detaching the process sheet.

Meanwhile, in the case of forming a columnar structure having modified pillar-shaped objects 112' composed of first pillar-shaped objects positioned on the first surface side and second pillar-shaped objects positioned on the second surface side as illustrated in FIG. 7(b), ultraviolet ray irradiation is carried out in two divided stages.

That is, initially, first ultraviolet ray irradiation is carried out, second pillar-shaped objects on the lower part of the coating layer, that is, on the second surface side, and a columnar structure-unformed region is left in the upper part of the coating layer, that is, the first surface side.

At this time, from the viewpoint of stably leaving a columnar structure-unformed region, it is preferable that the first ultraviolet irradiation is carried out in an oxygen-containing atmosphere so that the influence of oxygen inhibition can be utilized.

Next, second ultraviolet ray irradiation is carried out, and first pillar-shaped objects are formed in the columnar structure-unformed region left on the first surface side.

At this time, from the viewpoint of stably forming the first pillar-shaped objects, it is preferable that the second ultraviolet ray irradiation is carried out in a non-oxygen atmosphere so that the influence of oxygen inhibition can be suppressed.

EXAMPLES

Hereinafter, the present invention will be described in more detail by way of Examples.

Example 1

1. Production of Optical-diffusion Film (1) Synthesis of Low Refractive Index Polymerizable Compound (B) Component In a vessel, 2 moles of isophorone diisocyanate (IPDI) as a component (B1) and 2 moles of 2-hydroxyethyl methacrylate (HEMA) as a component (B3) were introduced relative to 1 mole of a polypropylene glycol (PPG) having a weight average molecular weight of 9,200 as a component (B2), and then the compounds were allowed to react according to a routine method. Thus, a polyether urethane methacrylate having a weight average molecular weight of 9,900 was obtained.

The weight average molecular weights of polypropylene glycol and polyether urethane methacrylate are values measured by gel permeation chromatography (GPC) under the conditions described below and calculated relative to polystyrene standards.

GPC analyzer: manufactured by Tosoh Corp., HLC-8020
GPC column: manufactured by Tosoh Corp. (in the following, described in the order of passage)
TSK guard column HXL-H
TSK gel GMHXL (×2)
TSK gel G2000HXL
Analytic solvent: tetrahydrofuran
Analysis temperature: 40° C.

(2) Preparation of Composition for Optical-diffusion Film

Next, a composition for optical-diffusion film was obtained by mixing 100 parts by weight of the polyether urethane methacrylate having a weight average molecular weight of 9,900 thus obtained as the component (B), with 150 parts by weight of o-phenylphenoxyethoxyethyl acrylate represented by the above formula (3) and having a molecular weight of 268 (manufactured by Shin Nakamura Chemical Co., Ltd., NK ESTER A-LEN-10) as a component (A) and 20 parts by weight (8 parts by weight relative to the total amount (100 parts by weight) of the component (A) and the component (B)) of 2-hydroxy-2-methyl-1-phenylpropan-1-one as a component (C), and then heating and mixing the mixture under the conditions of 80° C.

Meanwhile, the refractive indices of the component (A) and the component (B) were measured according to JIS K0062 using an Abbe refractometer (manufactured by Atago Co., Ltd., ABBE refractometer DR-M2, Na light source, wavelength 589 nm), and the refractive indices were found to be 1.58 and 1.46, respectively.

[Chemical Formula 11]

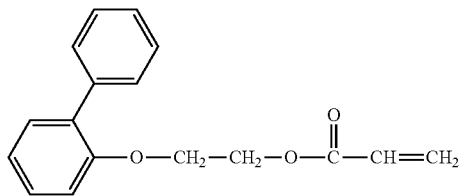

(3)

(3) Application Step

Subsequently, the composition for optical-diffusion film thus obtained was applied on a film-like transparent polyethylene terephthalate (hereinafter, referred to as PET) as a process sheet, and thus a coating layer having a film thickness of 210 μm was formed.

(4) Active Energy Ray Irradiation

Next, while the coating layer was moved in the B-direction as shown in FIG. 9(b), the coating layer was irradiated with parallel light having a parallelism of 20 or less (ultraviolet radiation emitted from a high pressure mercury lamp, having a primary peak wavelength at 365 nm, and other peaks at 254, 303 and 313 nm) such that the angle of irradiation (θ3 in FIG. 11) would be almost 0°, using an ultraviolet spot parallel light source (manufactured by Japan Technology System Corp.) having the central ray parallelism controlled to ±3° or less.

The peak illuminance at that time was set to 3.1 mW/cm², the cumulative amount of light was set to 58.9 mJ/cm², the lamp height was set to 240 mm, and the travel speed of the coating layer was set to 0.2 m/min.

Subsequently, in order to promote reliable curing, the exposed surface side of the coating layer was laminated with an ultraviolet-transmissive peeling film having a thickness of 38 μm (manufactured by Lintec Corp., SP-PET382050; center line average roughness at the surface on the side irradiated with ultraviolet radiation: 0.01 μm, haze value: 1.80%, image definition: 425, and transmittance for the wavelength of 360 nm: 84.3%).

Subsequently, the coating layer was completely cured by irradiating the coating layer, from above the peeling film, with a scattered light produced by making the direction of propagation of the above-mentioned parallel light random under the conditions of a peak illuminance of 10 mW/cm² and a cumulative amount of light of 150 mJ/cm², and thus an optical-diffusion film in which the film thickness excluding the process sheet and the peeling film was 210 μm, was obtained.

Meanwhile, the peak illuminance and the cumulative amount of light described above were measured by installing a UV METER (manufactured by Eye Graphics Co., Ltd., EYE ultraviolet cumulative illuminometer UVPF-A1) equipped with a light receiver at the position of the coating layer.

Furthermore, the film thickness of the optical-diffusion film thus obtained was measured using a constant pressure thickness meter (manufactured by Takara Co., Ltd., TECLOCK PG-02J).

Figure 12A:
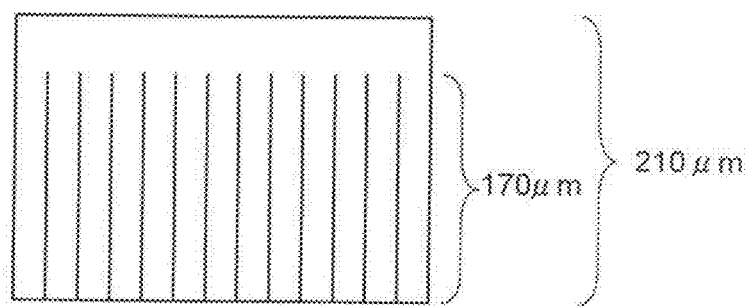
FIGS. 12(a) to 12(c) are a diagram and photographs provided to show a cross-section of the optical-diffusion film according to Example 1.
Figure 12B:
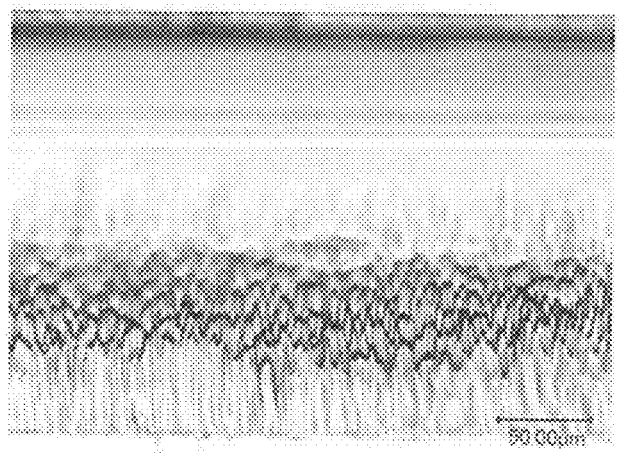

Furthermore, a schematic diagram of a cross-section obtained by cutting the optical-diffusion film thus obtained, at a plane that is parallel to the traveling direction of the coating layer and orthogonally intersects with the film plane, is shown in FIG. 12(a), and a photograph of the cross-section is presented in FIG. 12(b).

Figure 12C:
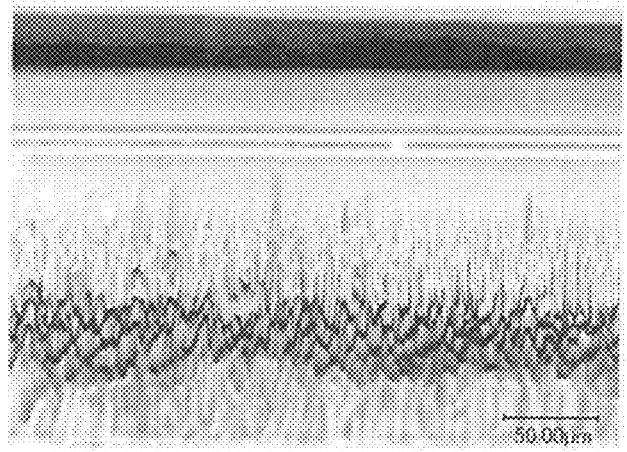

Furthermore, a cross-sectional photograph of a cross-section obtained by cutting the optical-diffusion film thus obtained, at a plane that is perpendicular to the traveling direction of the coating layer and orthogonally intersects with the film plane, is presented in FIG. 12(c). From FIGS. 12(b) and 12(c), it is understood that the internal structure in the optical-diffusion film thus obtained is a columnar structure having modified pillar-shaped objects illustrated in FIG. 4(a).

Meanwhile, cutting of the optical-diffusion film was performed using a razor, and image-capturing of the cross-sectional photographs was carried out by reflective observation using a digital microscope (manufactured by Keyence Corp., VHX-2000).

(5) Evaluation of Optical-diffusion Characteristics (5)-1 Measurement of Haze Value The haze value of the optical-diffusion film thus obtained was measured.

That is, for an optical-diffusion film obtained in a state of being sandwiched between a PET and a peeling film, a tacky adhesive layer was provided on the PET surface, and the optical-diffusion film was bonded to a soda glass plate having a thickness of 1.1 mm. This was used as a specimen for evaluation.

Next, light was made incident through the glass side of the specimen, as illustrated in FIG. 5, in the normal line direction of the film plane of the optical-diffusion film thus obtained, that is, such that the incident angle θ1=0°, and the haze value (%) at that time was measured according to JIS K 7136 using a haze meter (manufactured by Nippon Denshoku Industries Co., Ltd., NDH5000). The haze value thus obtained was 95%.

Meanwhile, the haze value (%) means a value calculated by the following mathematical expression (1), and in the following mathematical expression (1), the diffusion transmittance (%) is a value obtained by subtracting the parallel light transmittance (%) from the whole line transmittance (%), and the parallel light transmittance (%) means the transmittance of light having a spreading to ±2.50 with respect to the travel direction of straight transmitted light.

Haze value (%) =(Diffusion transmittance (%))/ (whole line transmittance (%))×100 [Mathematical Formula 1]

(5)-2 Analysis by Conoscopy

The optical-diffusion characteristics corresponding to those obtainable in a case in which the optical-diffusion film thus obtained was applied to a display device including a collimated backlight, were analyzed.

That is, for an optical-diffusion film obtained in a state of being sandwiched between a PET and a peeling film, a tacky adhesive layer was provided on the PET surface, and the optical-diffusion film was bonded to a soda glass plate having a thickness of 1.1 mm. This was used as a specimen for evaluation.

Figure 13A:
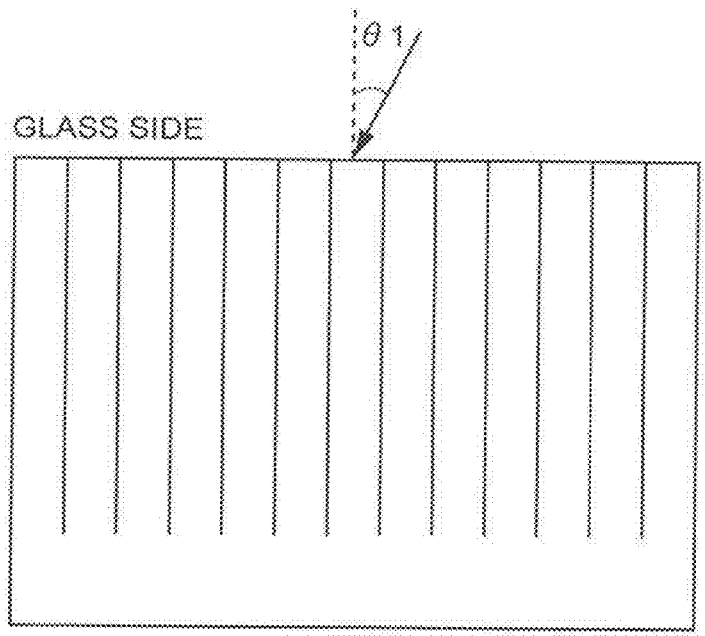
FIGS. 13(a) and 13(b) are a schematic diagram and a conoscopic image provided to show the optical-diffusion characteristics corresponding to the case in which the optical-diffusion film according to Example 1 was applied to a display device including a collimated backlight (incident angle θ1=0°).

Subsequently, light was made incident through the glass side of the specimen as illustrated in FIG. 13(a), using a conoscope (manufactured by Autronic-Melchers GmbH), in the normal line direction of the film plane of the optical-diffusion film of Example 1, that is, such that the incident angle θ1=0°. A conoscopic image showing the optical-diffusion condition thus obtained is presented in FIG. 13(b).

Incidentally, the radially drawn lines in each conoscopic image represent the azimuthal directions 0° to 180°, 45° to 225°, 90° to 270°, and 135° to 315°, respectively, and the concentrically drawn lines represent the polar angle directions 20°, 40°, 60°, and 80° in order from the inner side.

Therefore, the central portion of the concentric circles in a conoscopic image represents the diffusion condition of diffused light that has been diffused and emitted to the film front.

From such conoscopic images, it is understood that uniform light with suppressed straight penetration of incident light is diffused and emitted toward the film front.

Furthermore, the luminance (cd/cm$^2$) in relation to the emission angle (°) of diffused light obtainable in a case in which light at an incident angle θ1=0° was made incident to the optical-diffusion film of Example 1, and to the optical-diffusion films of Examples 2 to 3 and Comparative Example 1 for a comparison, was measured using a conoscope. An emission angle-luminance chart thus obtained is presented in FIG. 14.

Figure 14:
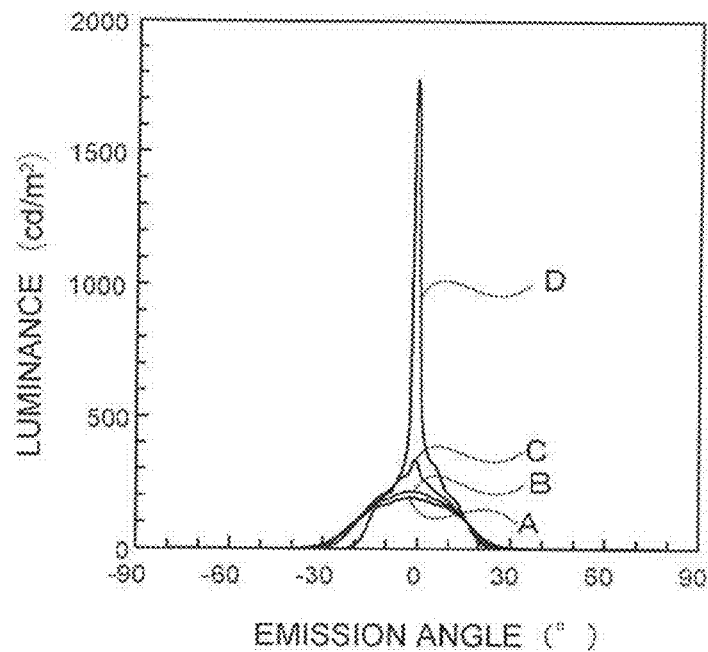
FIG. 14 is a diagram provided to make a comparison of the optical-diffusion characteristics corresponding to the cases in which the optical-diffusion films of Examples 1 to 3 and Comparative Example 1 were applied to a display device including a collimated backlight (incident angle θ1=0°).

Incidentally, the characteristics curve A in FIG. 14 is an emission angle-luminance chart for Example 1 (film thickness: 210 μm); the characteristics curve B is an emission angle-luminance chart for Example 2 (film thickness: 170 μm); the characteristics curve C is an emission angle-luminance chart for Example 3 (film thickness: 135 μm); and the characteristics curve D is an emission angle-luminance chart for Comparative Example 1 (film thickness: 110 μm).

From such emission angle-luminance charts, it is understood that even with the optical-diffusion films of Examples 1 to 3 and Comparative Example 1 having the same columnar structure composed of modified pillar-shaped objects, the diffusion condition toward the film front varies with the difference in the film thickness.

That is, it is understood that in the characteristics curves A to C, if the film thickness is in the range of 135 to 210 μm, the luminance at an emission angle of 0° is suppressed to 300 to 400 cd/m$^2$, and straight transmission of incident light is effectively suppressed.

Furthermore, it is understood that since the range of the emission angle (optical-diffusion angle region) is suitably spread to about −30° to 30°, and the change of luminance within the region is mild, uniform diffused light with less fluctuation and less glare is emitted.

On the other hand, it is understood that in the characteristics curve D, when the film thickness is 110 μm, the luminance at the emission angle of 0° increases rapidly to about 1800 cd/m$^2$, and straight transmission of incident light occurs noticeably.

Also, it is understood that the range of the emission angle (optical-diffusion angle region) is suitably spread to about −20 to 20; however, the change of luminance within the region is steep, and non-uniform diffused light with a large extent of fluctuation and glare is emitted.

Furthermore, the luminance (cd/cm$^2$) in relation to the emission angle (°) of diffused light in a case in which light at an incident angle θ1=0°, 5°, 10°, or 15° was made incident to the optical-diffusion film of Example 1, was measured using a conoscope. An emission angle-luminance chart thus obtained is presented in FIG. 15.

Figure 15:
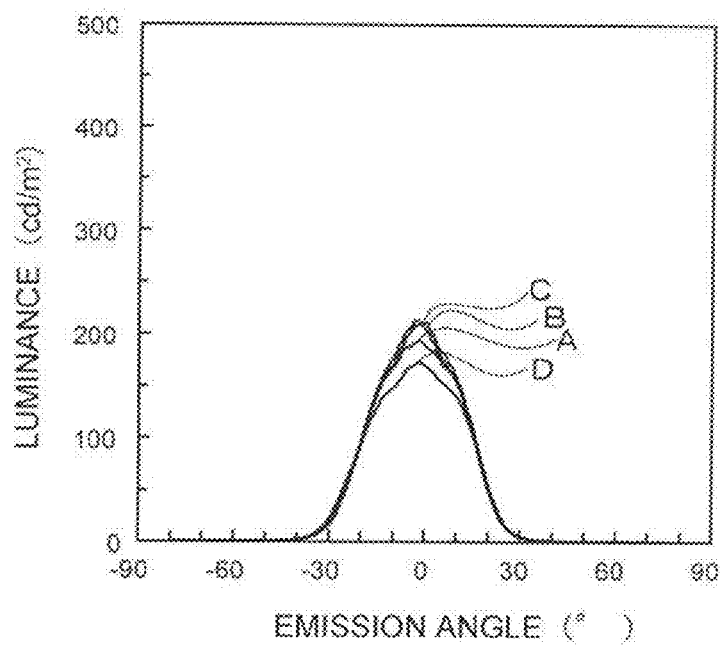
FIG. 15 is a diagram provided to explain the optical-diffusion characteristics corresponding to the case in which the optical-diffusion film according to Example 1 was applied to a display device including a collimated backlight (incident angle θ1=0° to 15°).

Incidentally, the characteristics curve A in FIG. 15 is an emission angle-luminance chart for the incident angle θ1=0°; the characteristics curve B is an emission angle-luminance chart for the incident angle θ1=5°; the characteristics curve C is an emission angle-luminance chart for the incident angle θ1=10°; and the characteristics curve D is an emission angle-luminance chart for the incident angle θ1=15°.

From such emission angle-luminance charts, it is understood that when the optical-diffusion film of Example 1 is used, even if the incident angle θ1 is varied in the range of 0° to 15°, the range of the emission angle (optical-diffusion angle region) is maintained at about −30° to 30° all the time, and even a light incident from a different angle can be diffused and emitted efficiently toward the film front.

Therefore, it is understood that when the half-value width of the incident light from a collimated backlight is at least 30° or less, the incident light can be diffused and emitted efficiently toward the front of the display device.

2. Production and Evaluation of Display Device

Next, as illustrated in FIG. 1, a display device was produced by bonding an optical-diffusion film thus obtained onto a polarizing plate, and also disposing a collimated backlight shown in FIG. 2 (half-value width of emitted light: 20°) as a backlight.

A predetermined image was displayed using the display device thus obtained, and the visibility condition was evaluated. It was confirmed that the viewing angle was wide at the front of the display device, and a satisfactory visibility condition without any glare was obtained.

Figure 13B:
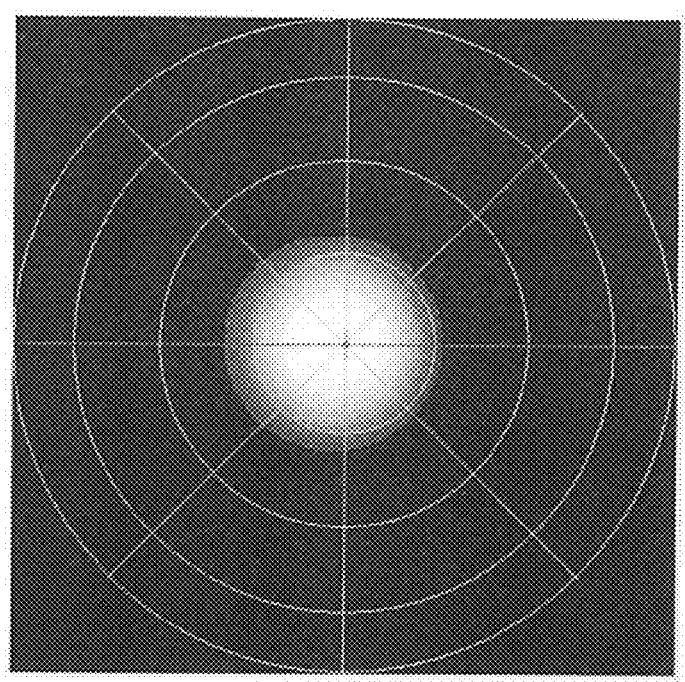

Furthermore, it was confirmed that the visibility condition of the displayed image in an actual display device and the optical-diffusion characteristics of the optical-diffusion film shown in FIG. 13(b), which were measured using a conoscope by using the aforementioned specimen as a sample, were correlated with each other and were not contradictory to each other.

Example 2

In Example 2, an optical-diffusion film was produced and evaluated in the same manner as in Example 1, except that when the composition for optical-diffusion film was applied, the film thickness of the coating layer was changed to 170 μm. The internal structure of the optical-diffusion film thus obtained was a columnar structure having modified pillar-shaped objects as illustrated in FIG. 4(a), similarly to Example 1. Also, the film thickness was 170 μm, and the measured haze value was 94%. Other results obtained therefrom are presented in FIGS. 16 and 17 and FIG. 14.

Figure 16:
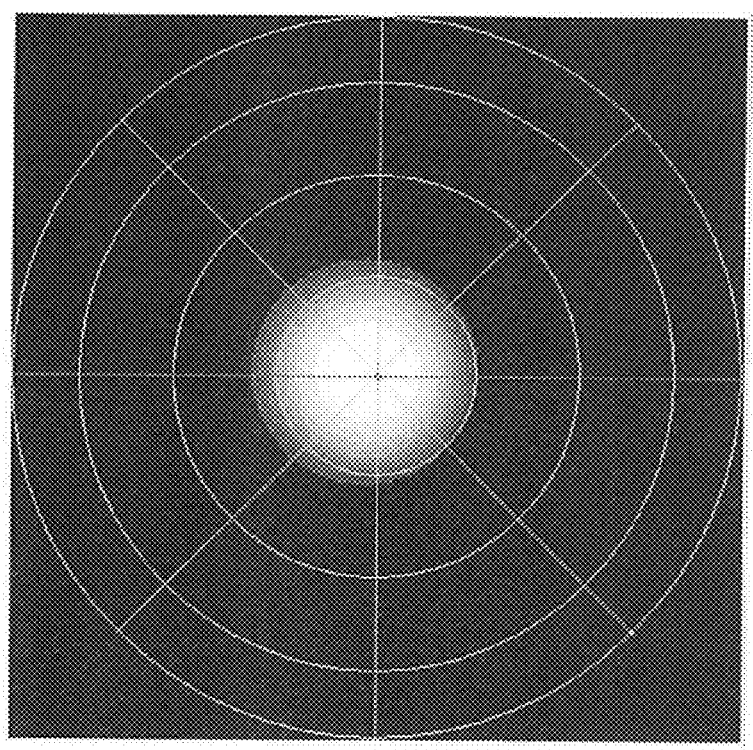
FIG. 16 is a conoscopic image provided to show the optical-diffusion characteristics corresponding to the case in which the optical-diffusion film according to Example 2 was applied to a display device including a collimated backlight (incident angle θ1=0°).

Here, FIG. 16 is a conoscopic image obtained in the case in which light was made incident to the optical-diffusion film of Example 2 using a conoscope such that the incident angle θ1=0°.

From such a conoscopic image, it is understood that uniform light with suppressed straight transmission of incident light is diffused and emitted toward the film front.

Figure 17:
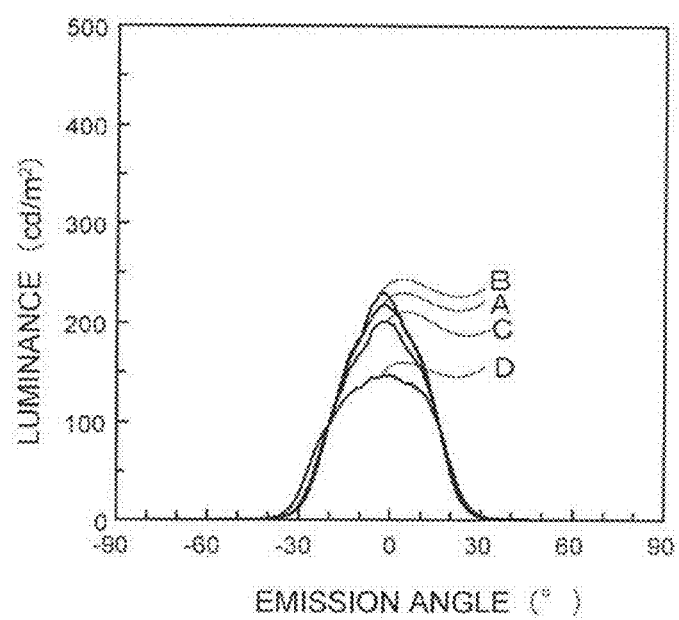
FIG. 17 is a diagram provided to show the optical-diffusion characteristics corresponding to the case in which the optical-diffusion film according to Example 2 was applied to a display device including a collimated backlight (incident angle θ1=0° to 15°).

Furthermore, FIG. 17 is an emission angle-luminance chart obtained in the case in which light at an incident angle θ1=0°, 5°, 10°, or 15° was made incident to the optical-diffusion film of Example 2 using a conoscope.

Incidentally, the characteristics curve A in FIG. 17 is an emission angle-luminance chart for an incident angle θ1=0°; the characteristics curve B is an emission angle-luminance chart for an incident angle θ1=5°; the characteristics curve C is an emission angle-luminance chart for an incident angle θ1=10°; and the characteristics curve D is an emission angle-luminance chart for an incident angle θ1=15°.

From such emission angle-luminance charts, it is understood that when the optical-diffusion film of Example 2 was used, there occurred a variance in the luminance of diffused light for various incident angles θ1 compared to the case of Example 1 having a large film thickness; however, even if the incident angle θ1 was varied in the range of 0° to 15°, the range of the emission angle (optical-diffusion angle region) was maintained at about −30° to 30° all the time. Therefore, it is understood that even lights incident from different angles can be diffused and emitted efficiently toward the film front.

Furthermore, the characteristics curve B in FIG. 14 is an emission angle-luminance chart for the optical-diffusion film of Example 2 at an incident angle θ1=0°.

Moreover, it was confirmed that the visibility condition of the displayed image in a display device to which the optical-diffusion film thus obtained was actually applied, and the optical-diffusion characteristics of the optical-diffusion film shown in FIG. 16 were correlated with each other and were not contradictory to each other.

Example 3

In Example 3, an optical-diffusion film was produced and evaluated in the same manner as in Example 1, except that when the composition for optical-diffusion film was applied, the film thickness of the coating layer was changed to 135 μm. The internal structure of the optical-diffusion film thus obtained was a columnar structure having modified pillar-shaped objects illustrated in FIG. 4(*a*), similarly to Example 1. Furthermore, the film thickness was 135 μm, and the measured haze value was 93%. Other results obtained therefrom are presented in FIGS. 18 and 19 and FIG. 14.

Figure 18:
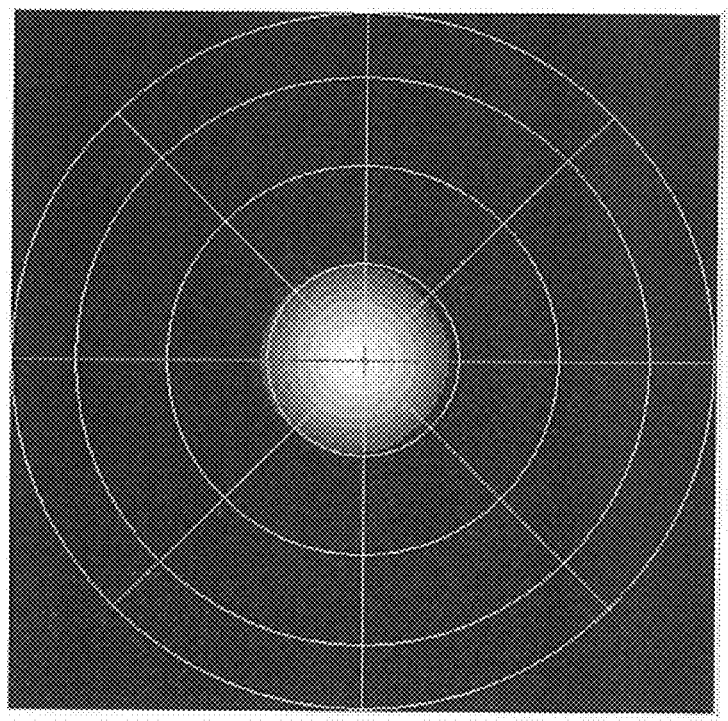
FIG. 18 is a conoscopic image provided to show the optical-diffusion characteristics corresponding to the case in which the optical-diffusion film according to Example 3 was applied to a display device including a collimated backlight (incident angle θ1=0°).

Here, FIG. 18 is a conoscopic image obtained in the case in which light was made incident to the optical-diffusion film of Example 3 using a conoscope such that the incident angle θ1=0°.

From such a conoscopic image, it is understood that uniform light with suppressed straight transmission of incident light is diffused and emitted toward the film front.

Figure 19:
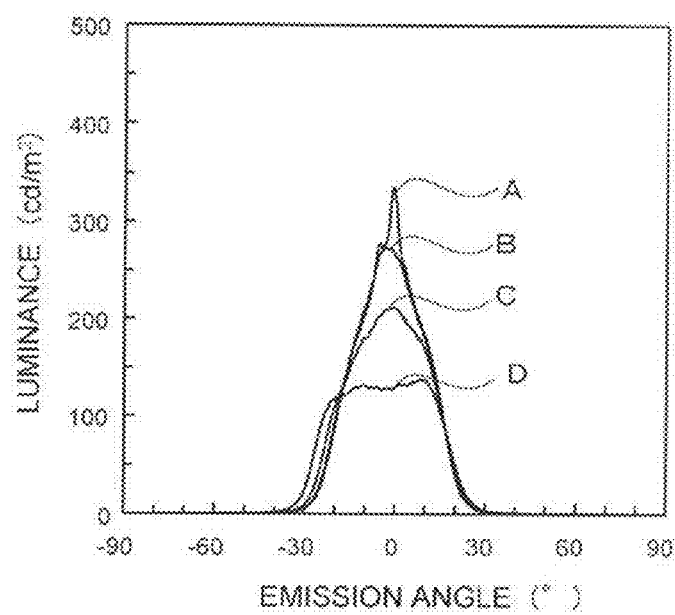
FIG. 19 is a diagram provided to show the optical-diffusion characteristics corresponding to the case in which the optical-diffusion film according to Example 3 was applied to a display device including a collimated backlight (incident angle θ1=0° to 15°).

Furthermore, FIG. 19 is an emission angle-luminance chart obtained in the case in which light at an incident angle θ1=0°, 5°, 10°, or 15° was made incident to the optical-diffusion film of Example 3 using a conoscope.

Incidentally, the characteristics curve A in FIG. 19 is an emission angle-luminance chart for an incident angle θ1=0°; the characteristics curve B is an emission angle-luminance chart for an incident angle θ1=5°; the characteristics curve C is an emission angle-luminance chart for an incident angle θ1=10°; and the characteristics curve D is an emission angle-luminance chart for an incident angle θ1=15°.

From such emission angle-luminance charts, it is understood that when the optical-diffusion film of Example 3 was used, there occurred a variance in the luminance of diffused light for various incident angles θ1 compared to the case of Example 1 or Example 2 having a large film thickness; however, even if the incident angle θ1 was varied in the range of 0° to 15°, the range of the emission angle (optical-diffusion angle region) was maintained at about −30° to 30° all the time. Therefore, it is understood that even lights incident from different angles can be diffused and emitted efficiently toward the film front.

Furthermore, the characteristics curve C in FIG. 14 is an emission angle-luminance chart for the optical-diffusion film of Example 3 at an incident angle θ1=0°.

Moreover, it was confirmed that the visibility condition of the displayed image in a display device to which the optical-diffusion film thus obtained was actually applied, and the optical-diffusion characteristics of the optical-diffusion film shown in FIG. 18 were correlated with each other and were not contradictory to each other.

Example 4

In Example 4, an optical-diffusion film was produced and evaluated in the same manner as in Example 1, except that at the time of active energy ray irradiation, the coating layer was irradiated with a parallel light having a parallelism of 2° or less such that the angle of irradiation (θ3 in FIG. 11) would be almost 0°, using an ultraviolet spot parallel light source (manufactured by Japan Technology System Corp.) having the central ray parallelism controlled to ±3° or less, instead of irradiating the coating layer with parallel light and then with scattered light while the peeling film was laminated on the exposed surface side of the coating layer. The film thickness of the optical-diffusion film thus obtained was 110 μm, and the measured haze value was 94%. Other results obtained therefrom are presented in FIGS. 20 to 23.

Figure 20A:
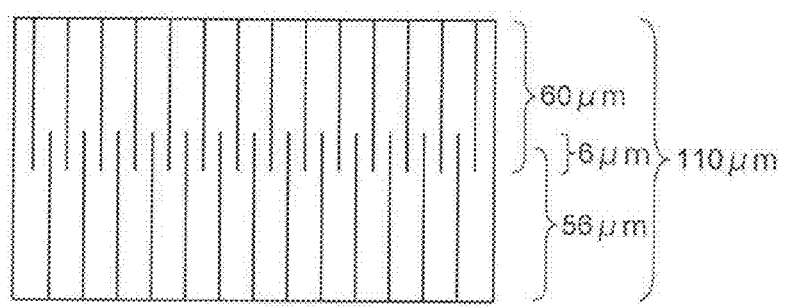
FIGS. 20(a) to 20(c) are a diagram and photographs provided to show a cross-section of the optical-diffusion film according to Example 4.
Figure 20B:
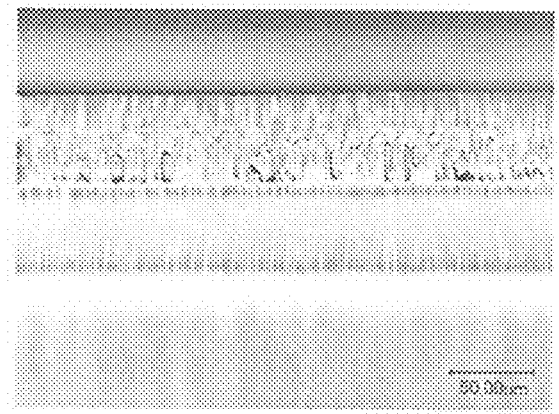
Figure 20C:
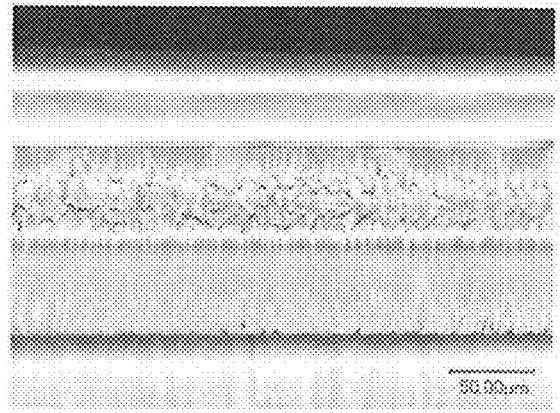

Here, FIG. 20(*a*) is a schematic diagram of a cross-section obtained by cutting the optical-diffusion film thus obtained, at a plane that is parallel to the travel direction of the coating layer and orthogonally intersects with the film plane, and FIG. 20(*b*) is a photograph of the cross-section.

Furthermore, FIG. 20(*c*) is a cross-sectional photograph of a cross-section obtained by cutting the optical-diffusion film thus obtained, at a plane that is perpendicular to the travel direction of the coating layer and orthogonally intersects with the film plane. From FIGS. 20(*b*) and 20(*c*), it is understood that the internal structure of the optical-diffusion film thus obtained is a columnar structure having modified pillar-shaped objects as illustrated in FIG. 7(*b*).

Figure 21:
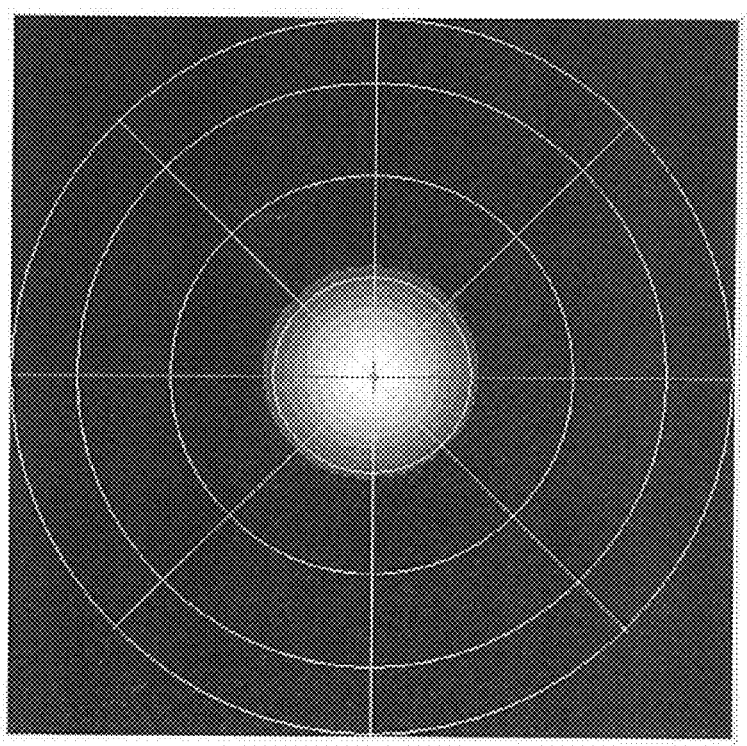
FIG. 21 is a conoscopic image provided to show the optical-diffusion characteristics corresponding to the case in which the optical-diffusion film according to Example 4 was applied to a display device including a collimated backlight (incident angle θ1=0°).

Furthermore, FIG. 21 is a conoscopic image obtained in the case in which light was made incident to the optical-diffusion film of Example 4 using a conoscope such that the incident angle θ1=0°.

From such a conoscopic image, it is understood that uniform light with suppressed straight transmission of incident light is diffused and emitted toward the film front.

Figure 22:
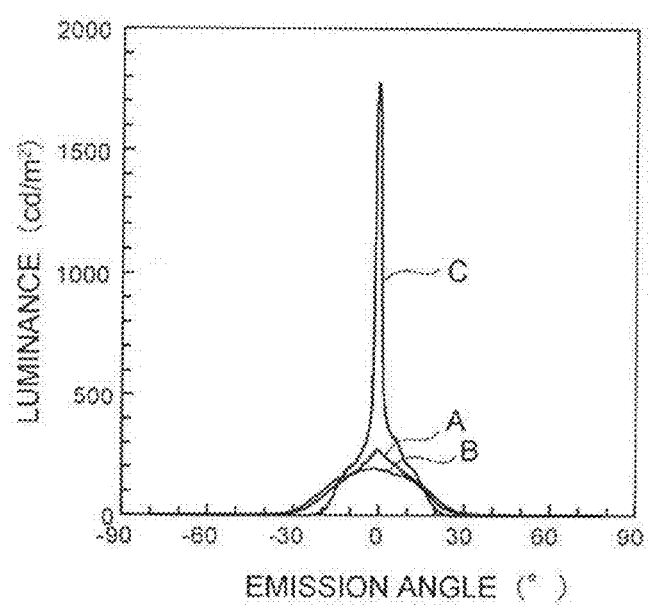
FIG. 22 is a diagram provided to make a comparison of the optical-diffusion characteristics corresponding to the cases in which the optical-diffusion films of Example 4, Example 1 and Comparative Example 1 were applied to a display device including a collimated backlight (incident angle θ1=0°).

Furthermore, FIG. 22 is an emission angle-luminance chart obtained in the case in which light at an incident angle θ1=0° was made incident to the optical-diffusion film of Example 4, and to the optical-diffusion films of Example 1 and Comparative Example 1 for a comparison, using a conoscope.

Incidentally, the characteristics curve A in FIG. 22 is an emission angle-luminance chart for Example 4 (film thickness: 110 μm); the characteristics curve B is an emission angle-luminance chart for Example 1 (film thickness: 210 μm); and the characteristics curve C is an emission angle-luminance chart for Comparative Example 1 (film thickness: 110 μm).

From such an emission angle-luminance chart shown in FIG. 22, it is understood that in the optical-diffusion films of Example 4 and Example 1 having columnar structures composed of different modified pillar-shaped objects, the diffusion condition toward the film front is different.

That is, when the characteristics curves A and B are compared, despite that the film thickness of Example 4 (characteristics curve A) is about a half of the film thickness of Example 1 (characteristics curve B), the characteristics curve A shows only a slightly higher luminance at a diffusion angle of 0° than that of the characteristics curve B, while the range of the emission angle (optical-diffusion angle region) of the characteristics curve A is broader than that of the characteristics curve B.

This is considered to be attributable to the fact that the internal structure in Example 4 (characteristics curve A) has a columnar structure composed of the modified pillar-shaped objects illustrated in FIG. 7(b), while the internal structure in Example 1 (characteristics curve B) has a columnar structure composed of the modified pillar-shaped objects illustrated in FIG. 4(a).

This is clear even from a comparison with Comparative Example 1 (characteristics curve C), which has the same film thickness as that of Example 4 (characteristics curve A) and as the same internal structure as that of Example 1 (characteristics curve B).

Figure 23:
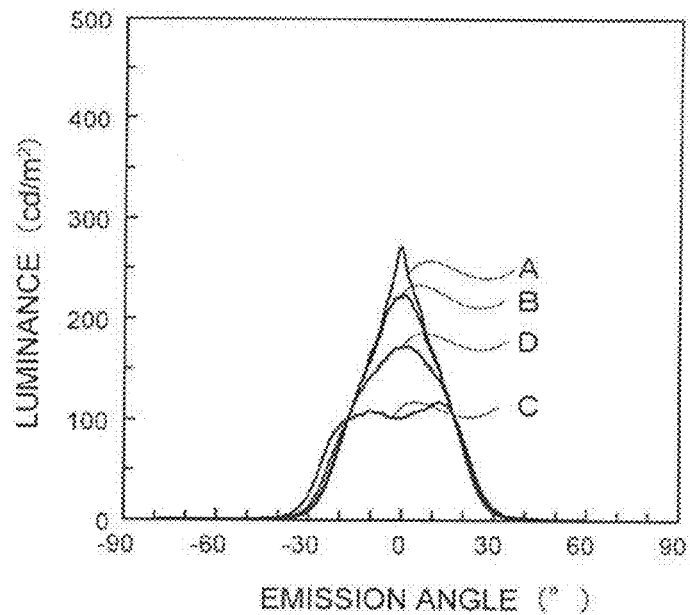
FIG. 23 is a diagram provided to show the optical-diffusion characteristics corresponding to the case in which the optical-diffusion film according to Example 4 was applied to a display device including a collimated backlight (incident angle θ1=0° to 15°).

Furthermore, FIG. 23 is an emission angle-luminance chart obtained in the case in which light at an incident angle θ1=0°, 5°, 10°, or 15° was made incident to the optical-diffusion film of Example 4 using a conoscope.

Incidentally, the characteristics curve A in FIG. 23 is an emission angle-luminance chart for an incident angle θ1=0°; the characteristics curve B is an emission angle-luminance chart for an incident angle θ1=5; the characteristics curve C is an emission angle-luminance chart for an incident angle θ1=10°; and the characteristics curve D is an emission angle-luminance chart for an incident angle θ1=15°.

From such emission angle-luminance charts, it is understood that when the optical-diffusion film of Example 4 was used, there occurred a variance in the luminance of diffused light for various incident angles θ1; however, even if the incident angle θ1 was varied in the range of 0° to 15°, the range of the emission angle (optical-diffusion angle region) was maintained at about −30° to 30° all the time. Therefore, it is understood that even lights incident from different angles can be diffused and emitted efficiently toward the film front.

Moreover, it was confirmed that the visibility condition of the displayed image in a display device to which the optical-diffusion film thus obtained was actually applied, and the optical-diffusion characteristics of the optical-diffusion film illustrate in FIG. 21 were correlated with each other and were not contradictory to each other.

Comparative Example 1

In Comparative Example 1, an optical-diffusion film was produced and evaluated in the same manner as in Example 1, except that when the composition for optical-diffusion film was applied, the film thickness of the coating layer was changed to 110 μm. The internal structure of the optical-diffusion film thus obtained was a columnar structure having modified pillar-shaped objects as illustrated in FIG. 4(a), similarly to Example 1. Furthermore, the film thickness was 110 μm, and the measured haze value was 79%. Other results thus obtained are presented in FIGS. 24 and 25 and FIG. 14.

Figure 24:
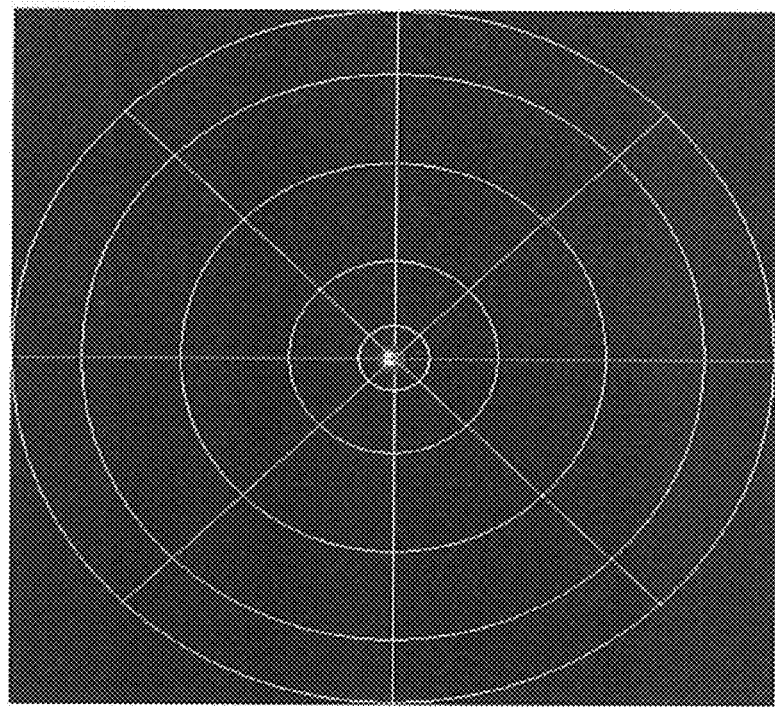
FIG. 24 is a conoscopic image provided to show the optical-diffusion characteristics corresponding to the case in which the optical-diffusion film according to Comparative Example 1 was applied to a display device including a collimated backlight (incident angle θ1=0θ).

Here, FIG. 24 is a conoscopic image obtained in the case in which light was made incident to the optical-diffusion film of Comparative Example 1 using a conoscope such that the incident angle θ1=0°.

From such a conoscopic image, it is understood that straight transmission of incident light toward the film front occurs noticeably.

Figure 25:
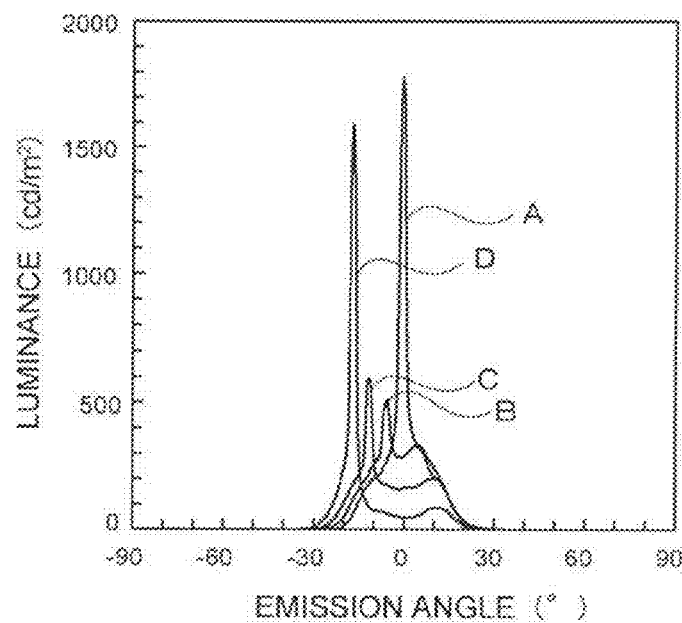
FIG. 25 is a diagram provided to show the optical-diffusion characteristics corresponding to the case in which the optical-diffusion film according to Comparative Example 1 was applied to a display device including a collimated backlight (incident angle θ1=0° to 15°).

Furthermore, FIG. 25 is an emission angle-luminance chart obtained in the case in which light at an incident angle θ1=0°, 5°, 10°, or 15° was made incident to the optical-diffusion film of Comparative Example 1 using a conoscope.

Meanwhile, the characteristics curve A in FIG. 25 is an emission angle-luminance chart for an incident angle θ1=0°; the characteristics curve B is an emission angle-luminance chart for an incident angle θ1=5°; the characteristics curve C is an emission angle-luminance chart for an incident angle θ1=10°; and the characteristics curve D is an emission angle-luminance chart for an incident angle θ1=15°.

From such emission angle-luminance charts, it is understood that in the optical-diffusion film of Comparative Example 1, the peaks of the emission angles for various incident angles θ1 vary to a large extent. Therefore, it is understood that lights incident from different angles may not be diffused and emitted efficiently toward the film front.

Furthermore, the characteristics curve D in FIG. 14 is an emission angle-luminance chart for the optical-diffusion film of Comparative Example 1 at an incident angle θ1=0°.

Moreover, it was confirmed that the visibility condition of the displayed image in a display device to which the optical-diffusion film thus obtained was actually applied, and the optical-diffusion characteristics of the optical-diffusion film illustrate in FIG. 24 were correlated with each other and were not contradictory to each other.

Comparative Example 2

In Comparative Example 2, an optical-diffusion film was produced and evaluated in the same manner as in Example 1, except that the film thickness of the coating layer was set to 175 μm, and the irradiation of active energy radiation was carried out as follows.

That is, an ultraviolet irradiating apparatus (manufactured by Eye Graphics Co., Ltd., ECS-4011GX) in which a linear high pressure mercury lamp was equipped with a cold mirror for light collection was prepared.

Next, a light blocking plate was installed on a heat wire cut-off filter frame, and the ultraviolet radiation irradiated to the surface of the coating layer was set up such that when the normal line of the coating layer surface as viewed from the major axis direction of the linear light source was designated as 0°, the angle of irradiation of direct ultraviolet radiation emitted from the linear light source (θ3 in FIG. 11) would be 0°.

At this time, the height from the coating layer surface to the linear light source was set to 500 mm, the peak illuminance was set to 2.0 mW/cm$^2$, and the cumulative amount of light was set to 50 mJ/cm$^2$.

Furthermore, in order to prevent the light reflected at the light blocking plate or the like from becoming stray light inside the irradiator and affecting the photocuring of the coating layer, a light blocking plate was also provided near the conveyor, and the apparatus was set up such that only the ultraviolet radiation emitted directly from the linear light source would be irradiated to the coating layer.

Subsequently, the coating layer was irradiated with ultraviolet radiation while the coating layer was moved by a conveyor at a speed of 0.2 m/min.

Next, in order to promote reliable curing, the coating layer was completely cured by irradiating the coating layer with scattered light over the peeling film in the same manner as in Example 1, and thus an optical-diffusion film was obtained.

The internal structure of the optical-diffusion film thus obtained was a louver structure in which plate-shaped regions that containing a cured product of the component (A) as a main component, and plate-shaped regions containing a cured product of the component (B) as a main component were disposed alternately along the travel direction of the coating layer. The film thickness was 175 µm, and the measured haze value was 81%. Other results thus obtained are presented in FIGS. 26 and 27.

Figure 26:
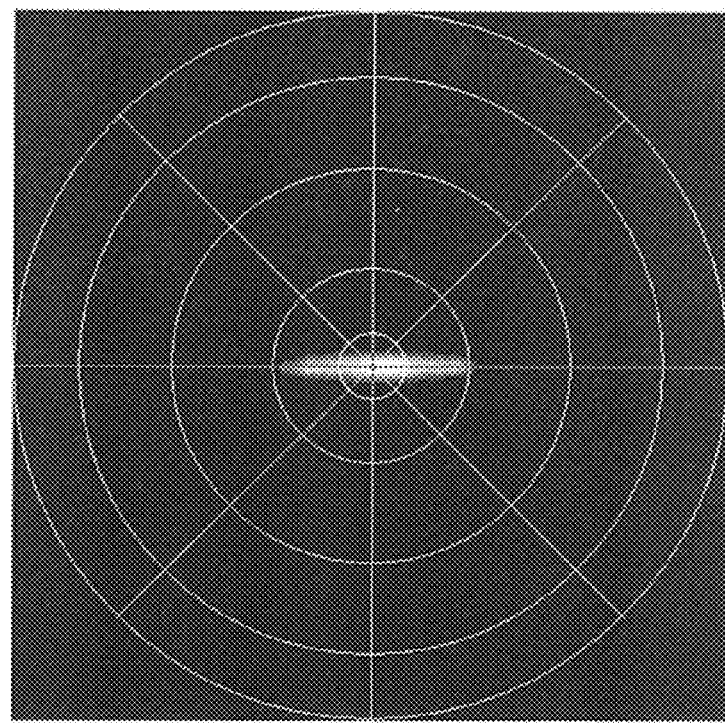
FIG. 26 is a conoscopic image provided to show the optical-diffusion characteristics corresponding to the case in which the optical-diffusion film according to Comparative Example 2 was applied to a display device including a collimated backlight (incident angle θ1=0°).

Here, FIG. 26 is a conoscopic image obtained in the case in which light was made incident to the optical-diffusion film of Comparative Example 2 using a conoscope such that the incident angle $\theta 1=0°$.

From such a conoscopic image, it is understood that although uniform light with suppressed straight transmission of incident light can be diffused and emitted toward the film front, since the incident light is anisotropically diffused, the incident light can be hardly diffused and emitted at any position that is even slightly shifted, in the vertical direction, that is, in the azimuthal direction of 0° to 180°, and the viewing angle is markedly narrow.

Figure 27:
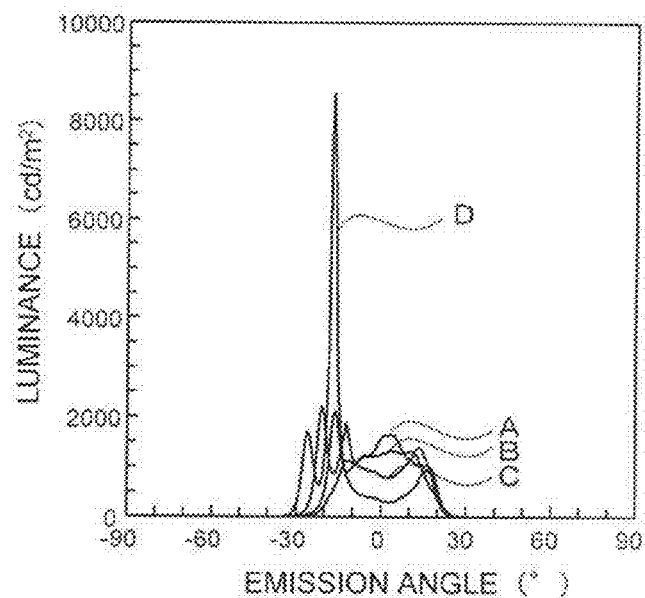
FIG. 27 is a diagram provided to show the optical-diffusion characteristics corresponding to the case in which the optical-diffusion film according to Comparative Example 2 was applied to a display device including a collimated backlight (incident angle θ1=0° to 15°).

Furthermore, FIG. 27 is an emission angle-luminance chart obtainable in the case in which light at an incident angle $\theta 1=0°$, 5°, 10°, or 15° was made incident to the optical-diffusion film of Comparative Example 2 using a conoscope.

Incidentally, the characteristics curve A in FIG. 27 is an emission angle-luminance chart for an incident angle $\theta 1=0°$; the characteristics curve B is an emission angle-luminance chart for an incident angle $\theta 1=5°$; the characteristics curve C is an emission angle-luminance chart for an incident angle $\theta 1=10°$; and the characteristics curve D is an emission angle-luminance chart for an incident angle $\theta 1=15°$.

From such emission angle-luminance charts, it is understood that in the optical-diffusion film of Comparative Example 2, the peaks of the emission angles for various incident angles $\theta 1$ vary to a large extent, and in the case of the incident angle $\theta 1=15°$, straight transmitted light occurs to a noticeable extent. Therefore, it is understood that lights incident from different angles may not be diffused and emitted efficiently toward the film front.

Furthermore, it was confirmed that the visibility condition of the displayed image in a display device to which the optical-diffusion film thus obtained was actually applied, and the optical-diffusion characteristics of the optical-diffusion film shown in FIG. 26 were correlated with each other and were not contradictory to each other.

Comparative Example 3

In Comparative Example 3, an ethyl acetate solution of a tacky adhesive material (solid content 14% by weight) was prepared by mixing 100 parts by weight of an acrylic copolymer having a weight average molecular weight of 1,800,000, obtained by polymerizing butyl acrylate and acrylic acid at a weight ratio of 95:5 according to a conventional method, with 15 parts by weight of tris(acryloxyethyl) isocyanurate (manufactured by Toagosei Co., Ltd., ARONIX M-315, molecular weight 423, trifunctional type), 1.5 parts by weight of a mixture of benzophenone and 1-hydroxycyclohexyl phenyl ketone at a weight ratio of 1:1 (manufactured by Ciba Specialty Chemicals Corp., IRGACURE 500) as a photopolymerization initiator, 0.3 parts by weight of trimethylolpropane-modified tolylene diisocyanate (manufactured by Nippon Polyurethane Industry Co., Ltd., CORONATE L) as an isocyanate-based crosslinking agent, 0.2 parts by weight of 3-glycidoxypropyltrimethoxysilane (manufactured by Shin-Etsu Chemical Co., Ltd., KBM-403) as a silane coupling agent, and 18.6 parts by weight of perfectly spherical silicone fine particles (manufactured by GE Toshiba Silicones Co., Ltd., TOSPEARL 145, average particle size 4.5 µm), further adding ethyl acetate, and mixing the mixture.

Next, the ethyl acetate solution of a tacky adhesive material thus obtained was applied on a polyethylene terephthalate film (manufactured by Toyobo Co., Ltd., COSMOSHINE A4100) having a thickness of 100 µm, using a knife type coating machine, such that the thickness after being dried would be 25 µm. Subsequently, the solution was treated by drying at 90° C. for 1 minute, and thus a tacky adhesive material layer was formed.

Subsequently, a peeling layer of a peeling film made of polyethylene terephthalate (manufactured by Lintec Corp., SP-PET3811) having a thickness of 38 µm as a peelable sheet, and the tacky adhesive material layer thus obtained were bonded, and 30 minutes after bonding, the tacky adhesive material layer was irradiated with ultraviolet radiation through the peeling film side using an electrodeless lamp (manufactured by Fusion Lamps, Ltd.) which used a H-valve, at an illuminance of 600 mW/cm$^2$ and an amount of light of 150 mJ/cm$^2$.

Then, the tacky adhesive material layer thus obtained after ultraviolet curing was used as an optical-diffusion film of Comparative Example 3 and was evaluated in the same manner as in Example 1. The haze value measured was 82%. Other results thus obtained are presented in FIGS. 28 to 29.

Figure 28:
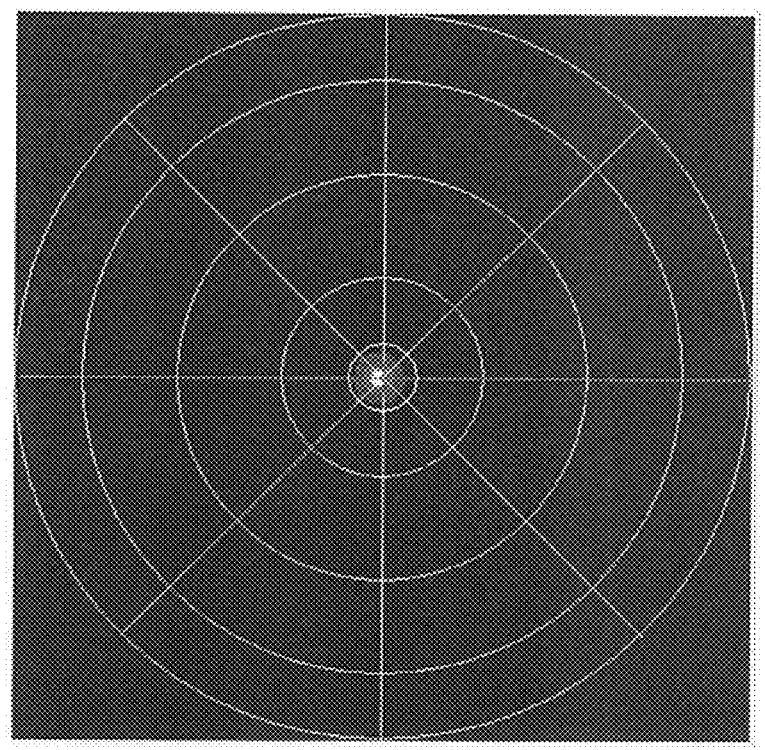
FIG. 28 is a conoscopic image provided to show the optical-diffusion characteristics corresponding to the case in which the optical-diffusion film according to Comparative Example 3 was applied to a display device including a collimated backlight (incident angle θ1=0°).

Here, FIG. 28 is a conoscopic image obtained in the case in which light was made incident to the optical-diffusion film of Comparative Example 3 using a conoscope such that the incident angle $\theta 1=0°$.

From such a conoscopic image, it is understood that straight transmission of incident light toward to the film front occurs to a remarkable extent.

Figure 29:
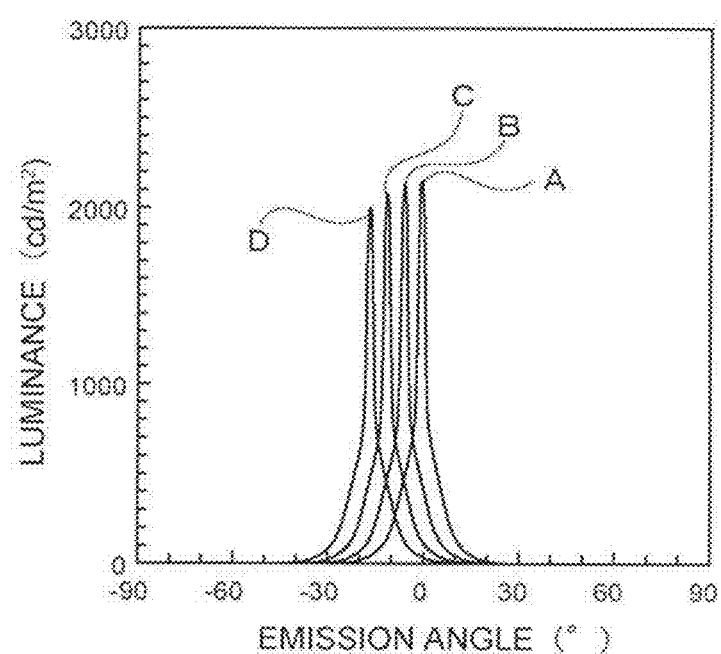
FIG. 29 is a diagram provided to show the optical-diffusion characteristics corresponding to the case in which the optical-diffusion film according to Comparative Example 3 was applied to a display device including a collimated backlight (incident angle θ1=0° to 15°).

Furthermore, FIG. 29 is an emission angle-luminance chart obtained in the case in which light at an incident angle $\theta 1=0°$, 5°, 10°, or 15° was made incident to the optical-diffusion film of Comparative Example 3 using a conoscope.

Incidentally, the characteristics curve A in FIG. 29 is an emission angle-luminance chart for an incident angle $\theta 1=0°$; the characteristics curve B is an emission angle-luminance chart for an incident angle $\theta 1=5°$; the characteristics curve C is an emission angle-luminance chart for an incident angle $\theta 1=10°$; and the characteristics curve D is an emission angle-luminance chart for an incident angle $\theta 1=15°$.

From such emission angle-luminance charts, it is understood that in the optical-diffusion film of Comparative Example 3, the peaks of the emission angles for various incident angles $\theta 1$ vary to a large extent depending largely on the incident angle $\theta 1$, and for various incident angles $\theta 1$, straight transmitted light occurs to a noticeable extent.

Therefore, it is understood that lights incident from different angles may not be diffused and emitted efficiently toward the film front.

Furthermore, it was confirmed that the visibility condition of the displayed image in a display device to which the optical-diffusion film thus obtained was actually applied, and the optical-diffusion characteristics of the optical-diffusion film shown in FIG. 28 were correlated with each other and were not contradictory to each other.

INDUSTRIAL APPLICABILITY

Thus, as described above, when the optical-diffusion film for display of the present invention is used, particularly in a case in which the optical-diffusion film is applied to a display device using a collimated backlight as a backlight of the display panel, a highly directional light emitted from the collimated backlight can be efficiently diffused and emitted toward the front of the display device as image display light, without allowing straight transmission of the emitted light.

Therefore, the optical-diffusion film for display of the present invention and a display device using the optical-diffusion film can be applied to a transmissive liquid crystal display device using a collimated backlight or the like, and it is expected that the optical-diffusion film for display and the display device can significantly contribute to the product quality enhancement of these devices.

EXPLANATIONS OF LETTERS OR NUMERALS

1: Display device, 10: display panel (liquid crystal display panel), 11: glass substrate, 12: glass substrate, 13: liquid crystal layer, 14: polarizing plate, 15: polarizing plate, 50: irradiated light from a light source, 60: parallel light, 100: optical-diffusion film, 101: coating layer, 102: process sheet, 112: pillar-shaped objects having a relatively high refractive index, 113: columnar structure, 113a: boundary surface of columnar structure, 114: region having a relatively low refractive index, 115: first surface, 116: second surface, 125: linear light source, 200: irradiated light parallelizing member, 202: point light source, 204: lens, 210: light blocking member, 210a: plate-shaped member, 210b: cylindrical member, 300: collimated backlight, 318: supporting sheet, 320: bead, 338: high luminance lamp, 340: reflective plate, 342: collimating plate, 344: optical-diffusion reflective binder, 410: light source, 420: integrating sphere

The invention claimed is:

1. A display device using a collimated backlight as a backlight of a display panel, the display device having an optical-diffusion film laminated on the display surface side of the display panel,
wherein the optical diffusion film is formed by photocuring two or more polymerizable compounds having different refractive indices while performing phase separation of the polymerizable compounds,
the optical-diffusion film for display, the film is a single-layered optical-diffusion film having a columnar structure in which plural pillar-shaped objects having a relatively high refractive index are arranged to stand close together in the film thickness direction in a region having a relatively low refractive index,
incident light is diffused at the boundary surface between the region having a relatively low refractive index and the plural pillar-shaped objects having a relatively high refractive index inside the columnar structure,
in the columnar structure, the maximum diameter in a cross-section of a pillar-shaped object is adjusted to a value within the range of 0.1 to 5 μm,
in the columnar structure, the space between adjacent pillar-shaped objects is adjusted to a value within the range of 0.1 to 5 μm,
when one surface of the optical-diffusion film is designated as a first surface, and the other surface is designated as a second surface, the pillar-shaped objects are modified pillar-shaped objects that undergo shape change from the first surface toward the second surface,
in the modified pillar-shaped objects, the diameter increases from the first surface toward the second surface,
the film thickness of the optical-diffusion film has a value within the range of 80 to 300 μm,
the length of the pillar-shaped objects in the normal line direction of the film plane is adjusted to a value within the range of 80 to 300 μm, and
the haze value obtainable in the case in which light is made incident in the normal line direction of the film plane has a value of 93% or more.

2. The display device according to claim 1, wherein the modified pillar-shaped objects have a bent part in the middle of the pillar-shaped objects.

3. The display device according to claim 1, wherein the modified pillar-shaped objects are composed of first pillar-shaped objects positioned on the first surface side, and second pillar-shaped objects positioned on the second surface side.

4. The display device according to claim 1, wherein the optical-diffusion film is formed by photocuring a composition for optical-diffusion film that includes a (meth)acrylic acid ester containing plural aromatic rings as a component (A), a urethane (meth)acrylate as a component (B), and a photopolymerization initiator as a component (C).

5. The display device according to claim 1, wherein the half-value width of the light emitted from the collimated backlight has a value of 40° or less.

6. The display device according to claim 1, wherein the display panel is a semi-transmissive display panel.

* * * * *